(12) United States Patent
Hauser et al.

(10) Patent No.: US 6,426,957 B1
(45) Date of Patent: *Jul. 30, 2002

(54) ASYNCHRONOUS TRANSFER MODE BASED SERVICE CONSOLIDATION SWITCH

(75) Inventors: Stephen A. Hauser, Burlington; Stephen A. Caldara, Sudbury; Thomas A. Manning, Northboro, all of MA (US)

(73) Assignees: Fujitsu Network Communications, Inc., Richardson, TX (US); Fujitsu Limited, Kanagawa-ken (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/209,526

(22) Filed: Dec. 11, 1998

Related U.S. Application Data

(63) Continuation of application No. 08/683,795, filed on Jul. 18, 1996, now Pat. No. 5,850,395.
(60) Provisional application No. 60/001,498, filed on Jul. 19, 1995.

(51) Int. Cl.[7] .............................................. H04L 12/28
(52) U.S. Cl. ..................... 370/413; 370/395.4; 370/389
(58) Field of Search ................................. 370/236, 398, 370/353, 395, 364, 414, 378, 391, 411, 418, 413, 390, 389, 230, 233, 395.4; 709/234, 231, 235; 365/221; 377/47

(56) References Cited

U.S. PATENT DOCUMENTS 3,804,991 A  4/1974  Hammond et al. .......... 379/222
3,974,343 A  8/1976  Cheney et al. .............. 379/244

(List continued on next page.)

FOREIGN PATENT DOCUMENTS

JP           484943        3/1992

OTHER PUBLICATIONS

An Ascom Timeplex White Paper, *Meeting Critical Requirements with Scalable Enterprise Networking Solutions Based on a Unified ATM Foundation*, pp. 1–12, Apr. 1994.

(List continued on next page.)

*Primary Examiner*—Hassan Kizou
*Assistant Examiner*—John Pezzlo
(74) *Attorney, Agent, or Firm*—Weingarten, Schurgin, Gagnebin & Lebovici LLP

(57) ABSTRACT

An asynchronous transfer mode (ATM) based service consolidation switch (10) includes an input/output module (22) having a to-switch port (TSPP) processor (90) and a from-switch port processor (FSPP) (92). The TSPP (90) and the FSPP (92) communicate with a bandwidth arbiter (114), multipoint topology controllers (116), and a data crossbar (117) on a switch control module (32). The TSPP (90) receives traffic over links for conversion into an internal cell format. Internal cells are buffered until allowed to transfer to an appropriate FSPP (92). Multipoint topology controllers (116) performs translations for internal switch flow control through interactions between the TSPPs (90), FSPPs (92), and the bandwidth arbiter (114). The bandwidth arbiter (114) performs appropriate bandwidth arbitration to allow internal cells to flow from TSPPs (90) to FSPPs (92) over the data crossbar (117).

5 Claims, 8 Drawing Sheets

U.S. PATENT DOCUMENTS

| | | | |
|---|---|---|---|
| 4,069,399 A | 1/1978 | Barrett et al. ................ | 370/363 |
| 4,084,228 A | 4/1978 | Dufond et al. .............. | 709/103 |
| 4,240,143 A | 12/1980 | Bessemer et al. ........... | 710/104 |
| 4,603,382 A | 7/1986 | Cole et al. .................... | 710/56 |
| 4,623,996 A * | 11/1986 | McMillen ................... | 370/418 |
| 4,715,030 A | 12/1987 | Koch et al. ................. | 370/401 |
| 4,727,537 A | 2/1988 | Nichols ....................... | 370/236 |
| 4,737,953 A | 4/1988 | Koch et al. ................. | 370/401 |
| 4,748,658 A | 5/1988 | Gopal et al. ................ | 379/221 |
| 4,797,881 A | 1/1989 | Ben-Artzi ................... | 370/402 |
| 4,821,034 A | 4/1989 | Anderson et al. ........ | 340/825.8 |
| 4,837,761 A | 6/1989 | Isono et al. ................. | 370/413 |
| 4,849,968 A | 7/1989 | Turner ........................ | 370/232 |
| 4,870,641 A | 9/1989 | Pattavina .................... | 370/397 |
| 4,872,157 A | 10/1989 | Hemmady et al. .......... | 370/400 |
| 4,872,159 A | 10/1989 | Hemmady et al. .......... | 370/352 |
| 4,872,160 A | 10/1989 | Hemmady et al. .......... | 370/353 |
| 4,872,197 A | 10/1989 | Pemmaraju .............. | 379/93.01 |
| 4,878,216 A | 10/1989 | Yunoki ....................... | 370/389 |
| 4,893,302 A | 1/1990 | Hemmady et al. .......... | 370/427 |
| 4,893,307 A | 1/1990 | McKay et al. ................ | 370/389 |
| 4,894,824 A | 1/1990 | Hemmady et al. .......... | 370/380 |
| 4,897,833 A | 1/1990 | Kent et al. ................... | 370/447 |
| 4,897,841 A | 1/1990 | Gang, Jr. .................... | 370/401 |
| 4,899,333 A | 2/1990 | Roediger .................... | 370/427 |
| 4,920,531 A | 4/1990 | Isono et al. ................. | 370/416 |
| 4,922,503 A | 5/1990 | Leone ......................... | 370/402 |
| 4,933,938 A | 6/1990 | Sheehy ....................... | 370/401 |
| 4,942,574 A | 7/1990 | Zelle .......................... | 370/400 |
| 4,947,390 A | 8/1990 | Sheehy ....................... | 370/401 |
| 4,953,157 A | 8/1990 | Franklin et al. ............ | 370/230 |
| 4,956,839 A | 9/1990 | Torii et al. ................... | 370/232 |
| 4,958,341 A | 9/1990 | Hemmady et al. .......... | 370/352 |
| 4,979,100 A | 12/1990 | Makris et al. .............. | 710/117 |
| 4,993,018 A | 2/1991 | Hajikano et al. ........... | 370/392 |
| 5,014,192 A | 5/1991 | Mansfield et al. ............. | 707/1 |
| 5,021,949 A | 6/1991 | Morten et al. .............. | 709/231 |
| 5,029,164 A | 7/1991 | Goldstein et al. ........... | 370/235 |
| 5,060,228 A | 10/1991 | Tsutsui et al. .............. | 370/402 |
| 5,067,123 A | 11/1991 | Hyodo et al. ............... | 370/396 |
| 5,070,498 A | 12/1991 | Kakuma et al. ............ | 370/233 |
| 5,083,269 A | 1/1992 | Syobatake et al. .......... | 711/100 |
| 5,084,867 A | 1/1992 | Tachibana et al. .......... | 370/398 |
| 5,084,871 A | 1/1992 | Carn et al. .................. | 370/462 |
| 5,090,011 A | 2/1992 | Fukuta et al. ............... | 370/230 |
| 5,090,024 A | 2/1992 | Vander Mey et al. ....... | 375/139 |
| 5,093,827 A | 3/1992 | Franklin et al. ............ | 370/354 |
| 5,093,912 A | 3/1992 | Dong et al. ................. | 709/104 |
| 5,115,429 A | 5/1992 | Hluchyj et al. .............. | 370/231 |
| 5,119,369 A | 6/1992 | Tanabe et al. ............... | 370/392 |
| 5,119,372 A | 6/1992 | Verbeek ...................... | 370/230 |
| 5,128,932 A | 7/1992 | Li ............................... | 370/236 |
| 5,130,975 A | 7/1992 | Akata ......................... | 370/416 |
| 5,130,982 A | 7/1992 | Ash et al. .................... | 370/352 |
| 5,132,966 A | 7/1992 | Hayano et al. .............. | 370/233 |
| 5,140,585 A | 8/1992 | Tomikawa ................... | 370/354 |
| 5,146,474 A | 9/1992 | Nagler et al. ................ | 375/224 |
| 5,146,560 A | 9/1992 | Goldberg et al. ........... | 712/200 |
| 5,150,358 A | 9/1992 | Punj et al. ................... | 370/418 |
| 5,151,897 A | 9/1992 | Suzuki ....................... | 370/401 |
| 5,157,657 A | 10/1992 | Potter et al. ................. | 370/440 |
| 5,163,045 A | 11/1992 | Caram et al. ............... | 370/409 |
| 5,163,046 A | 11/1992 | Hahne et al. ................ | 370/237 |
| 5,179,556 A | 1/1993 | Turner ........................ | 370/233 |
| 5,179,558 A | 1/1993 | Thacker et al. .............. | 370/406 |
| 5,185,743 A | 2/1993 | Murayama et al. .......... | 370/397 |
| 5,191,582 A | 3/1993 | Upp ............................ | 370/392 |
| 5,191,652 A | 3/1993 | Dias et al. ................... | 709/251 |
| 5,193,151 A | 3/1993 | Jain ............................ | 709/237 |
| 5,197,067 A | 3/1993 | Fujimoto et al. ........... | 370/236 |
| 5,198,808 A | 3/1993 | Kudo ....................... | 340/825.8 |
| 5,199,027 A | 3/1993 | Barri .......................... | 370/231 |
| 5,239,539 A | 8/1993 | Uchida et al. ............... | 370/398 |
| 5,253,247 A | 10/1993 | Hirose et al. ................ | 370/232 |
| 5,253,248 A | 10/1993 | Dravida et al. .............. | 370/228 |
| 5,255,264 A | 10/1993 | Cotton et al. ................ | 370/286 |
| 5,255,266 A | 10/1993 | Watanabe et al. ........... | 370/233 |
| 5,257,311 A | 10/1993 | Naito et al. ................. | 380/244 |
| 5,258,979 A | 11/1993 | Oomuro et al. ............. | 370/232 |
| 5,265,088 A | 11/1993 | Takigawa et al. ........... | 370/249 |
| 5,267,232 A | 11/1993 | Katsube et al. ............. | 370/230 |
| 5,267,235 A | 11/1993 | Thacker ...................... | 370/396 |
| 5,268,897 A | 12/1993 | Komine et al. ............. | 370/400 |
| 5,271,010 A | 12/1993 | Miyake et al. ............... | 370/392 |
| 5,272,697 A | 12/1993 | Fraser et al. ................ | 370/235 |
| 5,274,641 A | 12/1993 | Shobatake et l. ........... | 370/392 |
| 5,274,768 A | 12/1993 | Traw et al. .................. | 704/236 |
| 5,280,469 A | 1/1994 | Taniguchi et al. .......... | 370/250 |
| 5,280,470 A | 1/1994 | Buhrke et al. ............... | 370/232 |
| 5,282,201 A | 1/1994 | Frank et al. ................. | 370/403 |
| 5,283,788 A | 2/1994 | Morita et al. ................ | 370/236 |
| 5,285,446 A | 2/1994 | Yonehara .................... | 370/234 |
| 5,287,349 A | 2/1994 | Hyodo et al. ............... | 370/399 |
| 5,287,535 A | 2/1994 | Sakagawa et al. .......... | 370/389 |
| 5,289,462 A | 2/1994 | Ahmadi et al. ............. | 370/232 |
| 5,289,463 A | 2/1994 | Mobasser .................... | 370/230 |
| 5,289,470 A | 2/1994 | Chang et al. ................ | 711/173 |
| 5,291,481 A | 3/1994 | Doshi et al. ................. | 370/230 |
| 5,291,482 A | 3/1994 | McHarg et al. ............. | 370/413 |
| 5,295,134 A | 3/1994 | Yoshimura et al. ......... | 370/220 |
| 5,301,055 A | 4/1994 | Bagchi et al. ............... | 359/139 |
| 5,301,184 A | 4/1994 | Uriu et al. ................... | 370/219 |
| 5,301,190 A | 4/1994 | Tsukuda et al. ............. | 370/362 |
| 5,301,193 A | 4/1994 | Toyofuku et al. ........... | 370/395 |
| 5,303,232 A | 4/1994 | Proctor ....................... | 370/398 |
| 5,305,311 A | 4/1994 | Lyles .......................... | 370/390 |
| 5,309,431 A | 5/1994 | Tominaga et al. .......... | 370/235 |
| 5,309,438 A | 5/1994 | Nakajima .................... | 370/395 |
| 5,311,586 A | 5/1994 | Bogart et al. ................ | 379/221 |
| 5,313,454 A | 5/1994 | Bustini et al. ............... | 370/231 |
| 5,313,458 A | 5/1994 | Suzuki ....................... | 370/230 |
| 5,313,579 A * | 5/1994 | Chao .......................... | 709/234 |
| 5,315,586 A | 5/1994 | Charvillat ................... | 370/232 |
| 5,319,638 A | 6/1994 | Lin ............................. | 370/235 |
| 5,321,695 A | 6/1994 | Faulk, Jr. .................... | 370/401 |
| 5,323,389 A | 6/1994 | Bitz et al. .................... | 370/397 |
| 5,333,131 A | 7/1994 | Tanabe et al. ............... | 370/397 |
| 5,333,134 A | 7/1994 | Ishibashi et al. ............ | 370/447 |
| 5,335,222 A | 8/1994 | Kamoi et al. ................ | 370/230 |
| 5,335,325 A | 8/1994 | Frank et al. ................. | 711/163 |
| 5,339,310 A | 8/1994 | Taniguchi .................... | 370/397 |
| 5,339,317 A | 8/1994 | Tanaka et al. ............... | 370/460 |
| 5,339,318 A | 8/1994 | Tanaka et al. ............... | 370/399 |
| 5,341,366 A | 8/1994 | Soumiya et al. ............ | 370/233 |
| 5,341,373 A | 8/1994 | Ishibashi et al. ............ | 370/440 |
| 5,341,376 A | 8/1994 | Yamashita ................... | 370/466 |
| 5,341,483 A | 8/1994 | Frank et al. ................. | 711/206 |
| 5,345,229 A | 9/1994 | Olnowich et al. ........ | 340/825.8 |
| 5,350,906 A | 9/1994 | Brody et al. ................ | 235/379 |
| 5,355,372 A | 10/1994 | Sengupta et al. ........... | 370/367 |
| 5,357,506 A | 10/1994 | Sugawara .................... | 370/392 |
| 5,357,507 A | 10/1994 | Hughes et al. .............. | 370/234 |
| 5,357,508 A | 10/1994 | Le Boudec et al. ......... | 370/397 |
| 5,357,510 A | 10/1994 | Norizuki et al. ............ | 370/395 |
| 5,359,600 A | 10/1994 | Ueda et al. .................. | 370/399 |
| 5,361,251 A | 11/1994 | Aihara et al. ................ | 370/252 |
| 5,361,372 A | 11/1994 | Rege et al. .................. | 709/234 |
| 5,363,433 A | 11/1994 | Isono .......................... | 370/340 |
| 5,363,497 A | 11/1994 | Baker et al. ................. | 711/153 |
| 5,365,514 A | 11/1994 | Hershey et al. ............. | 370/241 |
| 5,369,570 A | 11/1994 | Parad ............................. | 705/8 |

| | | | |
|---|---|---|---|
| 5,371,893 A | 12/1994 | Price et al. | 710/241 |
| 5,373,504 A | 12/1994 | Tanaka et al. | 370/253 |
| 5,375,117 A | 12/1994 | Morita et al. | 370/420 |
| 5,377,262 A | 12/1994 | Bales et al. | 379/220 |
| 5,377,327 A | 12/1994 | Jain et al. | 709/235 |
| 5,379,297 A | 1/1995 | Glover et al. | 370/234 |
| 5,379,418 A | 1/1995 | Shimazaki et al. | 714/11 |
| 5,390,170 A | 2/1995 | Sawant et al. | 370/399 |
| 5,390,174 A | 2/1995 | Jugel | 370/392 |
| 5,390,175 A | 2/1995 | Hiller et al. | 370/398 |
| 5,390,184 A * | 2/1995 | Morris | 370/353 |
| 5,392,280 A | 2/1995 | Zheng | 370/353 |
| 5,392,402 A | 2/1995 | Robrock, II | 395/27 |
| 5,394,396 A | 2/1995 | Yoshimura et al. | 370/236 |
| 5,398,235 A | 3/1995 | Tsuzuki et al. | 370/219 |
| 5,400,337 A | 3/1995 | Munter | 370/399 |
| 5,402,415 A | 3/1995 | Turner | 370/390 |
| 5,412,648 A | 5/1995 | Fan | 370/414 |
| 5,414,703 A | 5/1995 | Sakue et al. | 370/395 |
| 5,418,942 A | 5/1995 | Krawchuk et al. | 707/3 |
| 5,420,858 A | 5/1995 | Marshall et al. | 370/352 |
| 5,420,988 A | 5/1995 | Elliott | 712/300 |
| 5,422,879 A | 6/1995 | Parsons et al. | 370/236 |
| 5,425,021 A | 6/1995 | Derby et al. | 370/408 |
| 5,425,026 A | 6/1995 | Mori | 370/410 |
| 5,426,635 A | 6/1995 | Mitra et al. | 370/229 |
| 5,432,713 A | 7/1995 | Takeo et al. | 707/505 |
| 5,432,784 A | 7/1995 | Ozveren | 370/235 |
| 5,432,785 A | 7/1995 | Ahmed et al. | 370/231 |
| 5,432,908 A | 7/1995 | Heddes et al. | 711/147 |
| 5,436,886 A | 7/1995 | McGill | 370/219 |
| 5,436,893 A | 7/1995 | Barnett | 370/392 |
| 5,440,547 A | 8/1995 | Easki et al. | 370/395 |
| 5,444,702 A | 8/1995 | Burnett et al. | 370/254 |
| 5,446,733 A | 8/1995 | Tsuruoka | 370/232 |
| 5,446,737 A | 8/1995 | Cidon et al. | 370/452 |
| 5,446,738 A | 8/1995 | Kim et al. | 370/395 |
| 5,448,559 A | 9/1995 | Hayter et al. | 370/398 |
| 5,448,621 A | 9/1995 | Knudsen | 455/427 |
| 5,450,406 A | 9/1995 | Esaki et al. | 370/396 |
| 5,452,296 A | 9/1995 | Shimizu | 370/399 |
| 5,452,299 A | 9/1995 | Thessin et al. | 99/492 |
| 5,455,820 A | 10/1995 | Yamada | 370/413 |
| 5,455,825 A | 10/1995 | Lauer et al. | 370/413 |
| 5,457,687 A | 10/1995 | Newman | 370/232 |
| 5,459,724 A | 10/1995 | Jeffrey et al. | 370/398 |
| 5,459,743 A | 10/1995 | Fukuda et al. | 714/819 |
| 5,461,611 A | 10/1995 | Drake Jr. et al. | 370/420 |
| 5,463,629 A | 10/1995 | Ko | 370/463 |
| 5,463,775 A | 10/1995 | DeWitt et al. | 702/186 |
| 5,465,331 A | 11/1995 | Yang et al. | 709/244 |
| 5,465,365 A | 11/1995 | Winterbottom | 707/101 |
| 5,469,003 A | 11/1995 | Kean | 326/39 |
| 5,473,608 A | 12/1995 | Gagne et al. | 370/401 |
| 5,475,679 A | 12/1995 | Munter | 370/395 |
| 5,479,401 A | 12/1995 | Bitz et al. | 370/397 |
| 5,479,402 A | 12/1995 | Hata et al. | 370/397 |
| 5,483,526 A | 1/1996 | Ben-Nun et al. | 370/395 |
| 5,485,453 A | 1/1996 | Wahlman et al. | 370/389 |
| 5,485,455 A | 1/1996 | Dobbins et al. | 370/255 |
| 5,485,456 A * | 1/1996 | Shtayer et al. | 370/395 |
| 5,487,063 A | 1/1996 | Kakuma et al. | 370/396 |
| 5,488,606 A | 1/1996 | Kakuma et al. | 370/219 |
| 5,491,691 A | 2/1996 | Shtayer et al. | 370/395 |
| 5,491,694 A | 2/1996 | Oliver et al. | 370/455 |
| 5,493,566 A | 2/1996 | Ljungberg et al. | 370/231 |
| 5,497,369 A | 3/1996 | Wainwright | 370/390 |
| 5,499,238 A | 3/1996 | Shon | 370/399 |
| 5,504,741 A | 4/1996 | Yamanaka et al. | 370/412 |
| 5,504,742 A | 4/1996 | Kakuma et al. | 370/420 |
| 5,506,834 A | 4/1996 | Sekihata et al. | 370/253 |
| 5,506,839 A | 4/1996 | Hatta | 370/236 |
| 5,506,956 A | 4/1996 | Cohen | 714/6 |
| 5,509,001 A | 4/1996 | Tachibana et al. | 370/230 |
| 5,509,007 A | 4/1996 | Takashima et al. | 370/391 |
| 5,513,134 A | 4/1996 | Cooperman et al. | 365/49 |
| 5,513,178 A | 4/1996 | Tanaka | 370/395 |
| 5,513,180 A | 4/1996 | Miyake et al. | 370/352 |
| 5,515,359 A | 5/1996 | Zheng | 370/231 |
| 5,519,690 A | 5/1996 | Suzuka et al. | 370/395 |
| 5,519,698 A * | 5/1996 | Lyles et al. | 370/411 |
| 5,521,905 A | 5/1996 | Oda et al. | 370/232 |
| 5,521,915 A | 5/1996 | Dieudonne et al. | 370/395 |
| 5,521,916 A | 5/1996 | Choudhury et al. | 370/414 |
| 5,521,917 A | 5/1996 | Watanabe et al. | 370/399 |
| 5,521,923 A | 5/1996 | Willmann et al. | 370/412 |
| 5,523,999 A | 6/1996 | Takano et al. | 370/389 |
| 5,524,113 A | 6/1996 | Gaddis | 370/395 |
| 5,526,344 A | 6/1996 | Diaz et al. | 370/364 |
| 5,528,588 A | 6/1996 | Bennett et al. | 370/396 |
| 5,528,590 A | 6/1996 | Iidaka et al. | 370/395 |
| 5,528,591 A | 6/1996 | Lauer | 370/231 |
| 5,530,695 A | 6/1996 | Digne et al. | 370/232 |
| 5,533,009 A | 7/1996 | Chen | 370/232 |
| 5,533,020 A | 7/1996 | Bryn et al. | 370/395 |
| 5,535,196 A | 7/1996 | Aihara et al. | 370/429 |
| 5,535,197 A | 7/1996 | Cotton | 370/414 |
| 5,537,394 A | 7/1996 | Abe et al. | 370/252 |
| 5,541,912 A | 7/1996 | Choudhury et al. | 370/412 |
| 5,544,168 A | 8/1996 | Jeffrey et al. | 370/391 |
| 5,544,169 A | 8/1996 | Norizuki et al. | 370/395 |
| 5,544,170 A | 8/1996 | Kasahara | 370/253 |
| 5,546,389 A | 8/1996 | Wippenbeck et al. | 370/412 |
| 5,546,391 A | 8/1996 | Hochschild et al. | 370/413 |
| 5,546,392 A | 8/1996 | Boal et al. | 370/395 |
| 5,550,821 A | 8/1996 | Akiyoshi | 370/397 |
| 5,553,057 A | 9/1996 | Nakayama | 370/241 |
| 5,553,068 A | 9/1996 | Aso et al. | 370/399 |
| 5,555,243 A | 9/1996 | Kakuma et al. | 370/352 |
| 5,555,265 A | 9/1996 | Kakuma et al. | 370/395 |
| 5,557,607 A | 9/1996 | Holden | 370/413 |
| 5,568,479 A | 10/1996 | Watanbe et al. | 370/399 |
| 5,570,361 A | 10/1996 | Norizuki et al. | 370/395 |
| 5,570,362 A | 10/1996 | Nishimura | 370/395 |
| 5,572,522 A | 11/1996 | Calamvokis et al. | 370/390 |
| 5,577,032 A | 11/1996 | Sone et al. | 370/390 |
| 5,577,035 A | 11/1996 | Hayter et al. | 370/395 |
| 5,583,857 A | 12/1996 | Soumiya et al. | 370/233 |
| 5,583,858 A | 12/1996 | Hanaoka | 370/392 |
| 5,583,861 A | 12/1996 | Holden | 370/395 |
| 5,590,132 A | 12/1996 | Ishibashi et al. | 370/236 |
| 5,600,820 A | 2/1997 | Johnston | 711/171 |
| 5,602,829 A | 2/1997 | Nie et al. | 370/235 |
| 5,610,913 A | 3/1997 | Tomonaga et al. | 370/219 |
| 5,623,405 A | 4/1997 | Isono | 705/30 |
| 5,625,846 A | 4/1997 | Kobayakawa et al. | 716/52 |
| 5,633,861 A | 5/1997 | Hanson et al. | 370/232 |
| 5,648,958 A | 7/1997 | Counterman | 370/458 |
| 5,787,086 A | 7/1998 | McClure et al. | 370/413 |
| 5,790,522 A * | 8/1998 | Fichou et al. | 370/236 |
| 5,790,770 A * | 8/1998 | McClure et al. | 709/231 |

OTHER PUBLICATIONS

Douglas H. Hunt, *ATM Traffic Management—Another Perspective*, Business Communications Review, Jul. 1994.

Richard Bubenik et al., *Leaf Initiated Join Extensions*, Technical Committee, Signalling Subworking Group, ATM Forum/94–0325R1, Jul. 1. 1994.

Douglas H. Hunt et al., *Flow Controlled Virtual Connections Proposal for ATM Traffic Management (Revision R2)*, Traffic Management Subworking Group, ATM_Forum/94–0632R2, Aug. 1994.

Flavio Bonomi et al., *The Rate–Based Flow Control Framework for the Available Bit Rate ATM Service*, IEEE Network, Mar./Apr. 1995, pp. 25–39.

R. Jain, *Myths About Congestion Management in High Speed Networks*, Internetworking Research and Experience, vol. 3, 101–113 (1992).

Douglas H. Hunt et al., *Credit–Based FCVC Proposal for ATM Traffic Managemet (Revision R1)*, ATM Forum Technical Committee Traffic Management Subworking Group, ATM_Forum/94–0168R1, Apr. 28, 1994.

Douglas H. Hunt et al., *Action Item Status for Credit–Based FCVC Proposal* ATM_Forum Technical Committee Traffic Management Subworking Group, ATM Forum/94–0439, Apr. 28, 1994.

Timothy P. Donahue et al., *Arguments in Favor of Continuing Phase 1 as the Initial ATM Forum P–NNI Routing Protocol Implementation*, ATM Forum Technical Committee, ATM Forum/94–0460, Apr. 28, 1994.

Richard Bubenick et al., *Leaf Initiated Join Extensions*, Technical Committee, Signalling Subworking Group, ATM Forum/94–0325, Apr. 28, 1994.

Rob Coltun et al., *PRP: A P–NNI Routing Protocol Proposal*, ATM Forum Technical Committee, ATM_Forum/94–0492, Apr. 28, 1994.

Richard Bubenik et al., *Leaf Initiated Join Extensions*, ATM Forum Technical Committee, Signalling Subworking Group, ATM Forum 94–0325, Apr. 28, 1994.

Richard Bubenik et al., *Requirements For Phase 2 Signaling Protocol*, ATM Forum Technical Committee, Signalling Subworking Group, ATM Forum 94–1078, Jan. 1, 1994.

H.T. Kung and K. Chang, *Receiver–Oriented Adaptive Buffer Allocation in Credit–Based Flow Control for ATM Networks*, Proceedings of INFOCOM '95, Apr. 2–6, 1995, pp. 1–14.

H.T. Kung et al., *Credit–Based Flow Control for ATM Networks: Credit Update Protocol, Adaptive Credit Allocation, and Statistical Multiplexing*, Proceedings of ACM SIGCOMM '94 Symposium on Communications Architectures, Protocols and Applications, Aug. 31–Sept. 2, 1994, pp. 1–14.

SITA, ATM RFP: C–Overall Technical Requirements, Sep. 1994.

Hosein F. Badran et al., *Head of Line Arbitration in ATM Switches with Input–Output Buffering and Backpressure Control*, Globecom, pp. 347–351, 1991.

Lepistö, M., "ATM chips and products", Jan. 25, 1995, 36 pages.

Affidavit of Barry C. Kantner, Apr. 17, 1997.

Affidavit of Thomas A. Manning, Apr. 17, 1997.

* cited by examiner

TO FIG. 2b

ASYNCHRONOUS TRANSFER MODE BASED SERVICE CONSOLIDATION SWITCH

RELATED APPLICATIONS

This application claims the benefit of U.S. provisional application Serial No. 60/001,498, filed Jul. 19, 1995, and is a continuation of U.S. patent application Ser. No. 08/683,795, filed Jul. 18, 1996 now U.S. Pat. No. 5,850,395.

TECHNICAL FIELD OF THE INVENTION

The present invention relates in general to telecommunications networks and more particularly to an asynchronous transfer mode based service consolidation switch.

BACKGROUND OF THE INVENTION

A communication system includes a collection of components that communicate, manipulate, and process information in a variety of ways. The system may support different access technologies, such as frame relay, circuit services, and new and evolving connection-based or connectionless services, that communicate information, such as data, voice, and video. Switches in the communication system employ hardware and software to route information generated by access technologies to an intended destination. In an integrated services network, switches may route information among access technologies in a unified manner.

With an increasing demand for more sophisticated and higher bandwidth communication, switches in a communication system must be scalable and adaptable to the particular needs of the users. Also, switches should support existing access technologies, and provide a flexible framework for new and evolving services.

Existing switches in an integrated services environment suffer from several disadvantages. Switches fail to be modular and scalable to adapt, for example, to the needs and resources of a small private network serving hundreds of users, as well as a larger public network serving tens of thousands of users. Often, switches only support one or a few number of access technologies and offer limited expansion capabilities. Also, as integrated services networks get larger and more complex, existing switches may fail to provide adequate redundancy and fault isolation.

SUMMARY OF THE INVENTION

From the foregoing, a need has arisen for a telecommunications switch that integrates a variety of services through an asynchronous transfer mode based operation. In accordance with the present invention, an asynchronous transfer mode based service consolidation switch is provided that substantially eliminates or reduces disadvantages and problems associated with conventional telecommunications switches.

According to an embodiment of the present invention there is provided an asynchronous transfer mode based service consolidation switch that includes a to-switch port processor for converting network traffic into cells having an internal cell based format. A bandwidth arbiter determines appropriate bandwidth to transfer the cells stored at the to-switch port processor. A data crossbar transfer the cells from the to-switch port processor according to the determined bandwidth. A from-switch port processor receives the cells from the data crossbar and converts the cells into a network traffic configuration for transfer over a network link. A multipoint topology controller controls an amount of cell flow within the data crossbar.

The present invention provides various technical advantages over conventional telecommunication switches. For example, one advantage is the ability to transfer cells with, guarantees against cell loss. Another example is to provide switch flow control within a telecommunication switch. Other examples are readily ascertainable by one skilled in the art from the following figures, descriptions and claims.

BRIEF DESCRIPTION OF THE DRAWINGS

For a more complete understanding of the present invention and the advantages thereof, reference is now made to the following description taken in conjunction with the accompanying drawings, wherein like reference numerals represent like parts, in which.

DETAILED DESCRIPTION OF THE INVENTION

Figure 1:
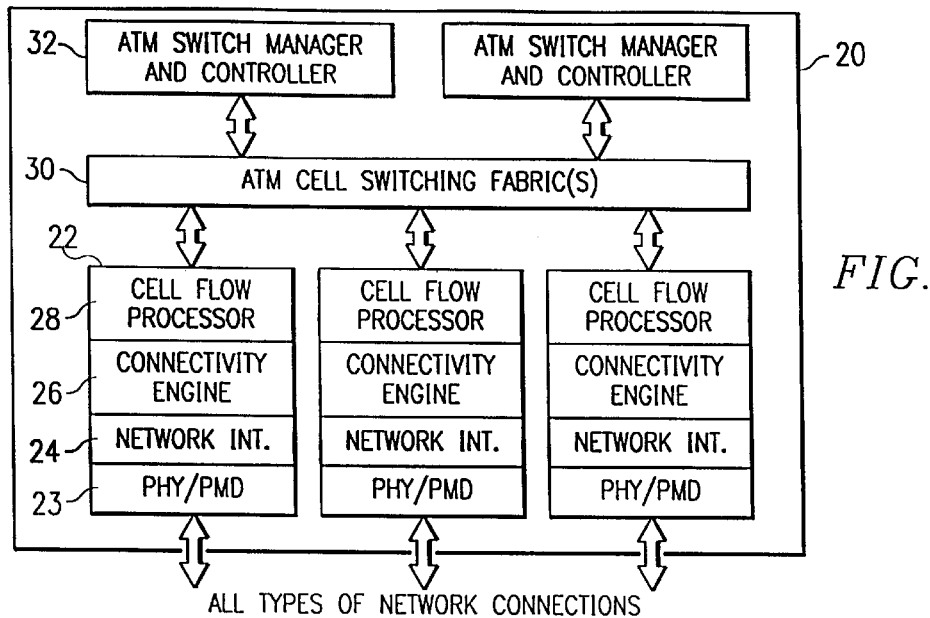
FIG. 1 illustrates a simplified block diagram of an asynchronous transfer mode (ATM) based service consolidation switch.

FIG. 1 is a simplified block diagram of an asynchronous transfer mode (ATM) based service consolidation switch 20. ATM switch 20 includes a plurality of network adaptation input/output modules 22 that receive network traffic from, and transmit network traffic to a variety of external network connections in the form of ATM cells. Input/output modules 22 include a physical interface 23, a network interface 24, a connectivity engine 26, and a cell flow processor 28. Network interface 24 provides compatibility functions between the external network connections in ATM switch 20 through cell oriented, frame oriented, circuit oriented, or other types of traffic received configurations. Connectivity engine 26 converts traffic from the external network connections into an internal cell format for processing within ATM switch 20. For traffic transmitted to the external network connections, connectivity engine 26 converts the internal cell format of ATM switch 20 into the appropriate network traffic configuration. Cell flow processor 28 provides sophisticated real time traffic management to guarantee quality of service for each virtual connection.

Traffic carried in the internal cell format flows through ATM switch 20 via a cell switching fabric 30. The flow of traffic configured in the internal cell format is controlled by an ATM switch manager and controller 32. ATM switch manager and controller 32 provides powerful call control functions to direct switch resources to control configuration and quality of service as requested for each virtual connection.

Through input/output modules 22 and switch control modules 32, ATM switch 20 provides the mechanisms to manage access to four types of resources (allocated bandwidth, dynamic bandwidth, allocated buffers, and dynamic buffers) in order to support four different service traffic types (constant bit rate, variable bit rate, available bit rate, and unspecified bit rate). Application services, such as video, voice, email, bulk data transfer, data transaction processing, etc., require different service traffic types with individual quality of service requirements. ATM switch 20, through input/output module 22 and switch control module 32, supports four service traffic types—constant bit rate, variable bit rate, available bit rate, and unspecified bit rate.

The constant bit rate service traffic type is used to emulate legacy circuit connections. The variable bit rate service traffic type is used in applications that have bursty bandwidth requirements and still require a bounded delay from transmitter to receiver. Examples of applications that would use the variable bit rate service traffic type are compressed video and frame relay. These applications could use the constant bit rate service traffic type instead of the variable bit rate service traffic type by signaling for a constant bit rate bandwidth specification that is equal to the maximum burst rate. However, this results in extra costs since the bandwidth and buffer resources are allocated even when the application is not transferring at maximum rate, hence these applications can signal for a sustained rate which gets allocated resources and a peak rate which is serviced dynamic resources. The available bit rate service traffic type is used when the application can tolerate order of magnitude variations in delay and require a low cost service which is provided by utilizing bandwidth and buffering resources are shared among many connections. The unspecified bit rate service does not have delay guarantees.

ATM switch 20 provides the mechanisms to manage four types of resources in order to support the different service traffic types. The resources managed by ATM switch 20 are allocated bandwidth, dynamic bandwidth, allocated buffers, and dynamic buffers. ATM switch 20 provides quality of service guarantees per traffic type and per connection for all network topologies including point-to-point connections, point-to-multipoint connections, multipoint-to-point connections, and multipoint-to-multipoint connections. Allocated bandwidth is used for cell transfer opportunities occurring at regularly scheduled intervals, such as with constant bit rate traffic types. Dynamic bandwidth is not only unallocated bandwidth but also unused allocated bandwidth. This is a shared resource that is given to connections based on service class and priority. Allocated buffers are buffers that are reserved for each connection sustained rate buffering requirements on a connection by connection basis. Dynamic buffers are a pool of buffers that are reserved to perform rate matching between a set of connections incoming peak bandwidth and the outgoing dynamic bandwidth both of which are instantaneously changing. This pool of buffers are shared between connections. Variable bit rate, available bit rate, and unspecified bit rate serve as traffic types which utilize dynamic bandwidth to achieve high line utilization.

To provide the service guarantees and precise allocation of resources, ATM switch 20 supports per virtual channel queuing. Per virtual channel queuing allows for connection fire-walling such that queuing and bandwidth management mechanisms can be applied to individual connections rather than a group of connections. With the per virtual channel queuing building block in place, ATM switch 20 precisely schedules bandwidth to a constant bit rate flow with an effective payload throughput and allocates the bandwidth up to the peak cell rate in expectation that the data rate is constant and fully occupied. However, it is unlikely that all the allocated bandwidth will be needed to support the constant bit rate service traffic type. In order to take maximum advantage of network resources and lower the cost of network operation, unused allocated-bandwidth and unallocated link bandwidth should be rapidly reallocated to other connections. ATM switch 20 uses scheduling techniques to grant dynamic bandwidth fairly between competing resources in order to support variable bit rate, available bit rate, and unspecified bit rate service traffic types.

Figure 2A:
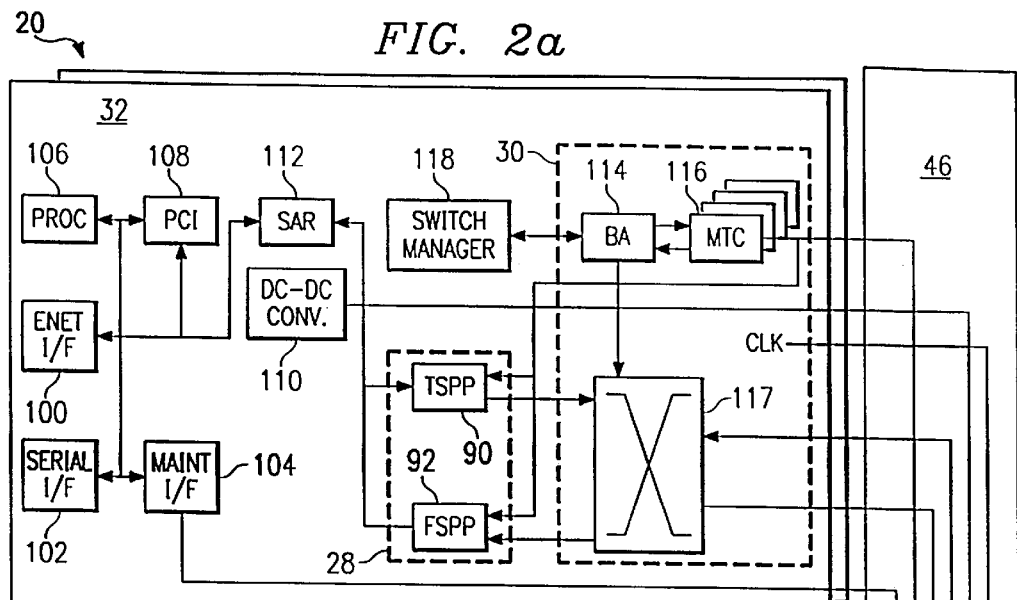
FIGS. 2a and 2b illustrates a detailed block diagram of the ATM switch.
Figure 2A:
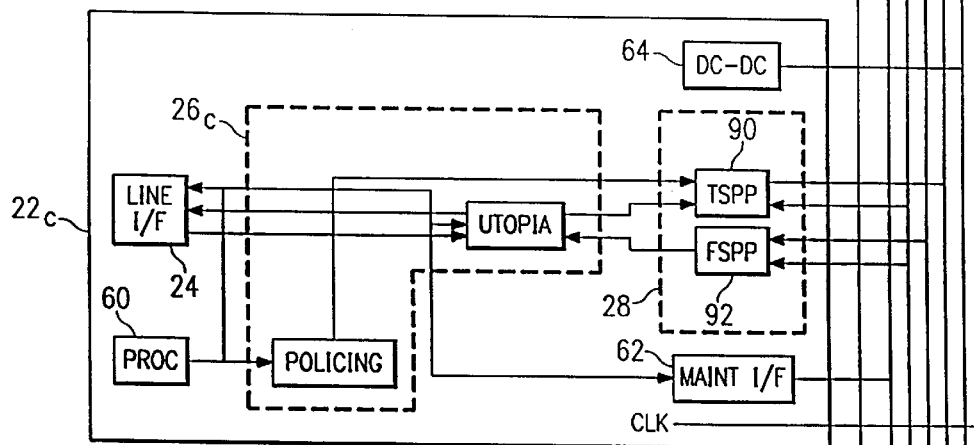
Figure 2A:
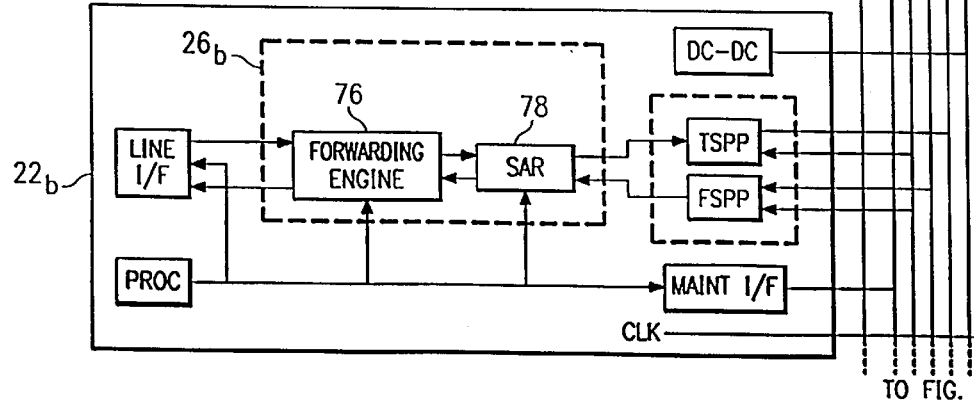
Figure 2B:
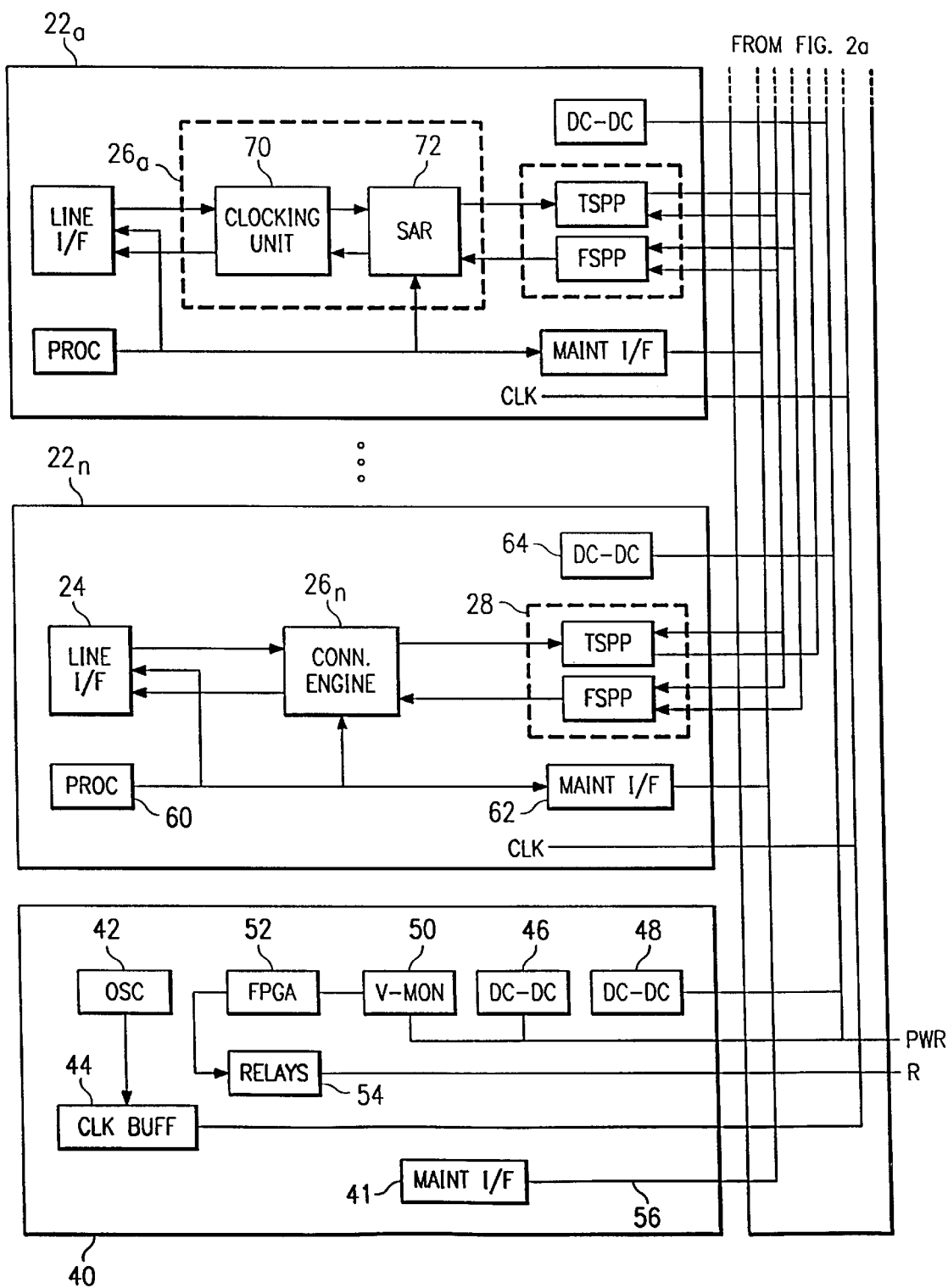

FIGS. 2a and 2b shows a detailed layout of ATM switch 20. ATM switch 20 includes an alarm relay service module 40, input/output modules 22a, 22b, 22c, and 22n a switch control module 32, and a backplane 46. Alarm relay service module 40 provides the power monitoring and reference clock signals for each of the other modules within ATM switch 20. Input/output modules 22a, 22b, 22c, and 22d provide the interface between a variety of external network connections and the internal cell format within ATM switch 20. Switch control module 32 provides the call control and traffic supervision within ATM switch 20. Backplane 46 provides the physical interconnections between each module within ATM switch 20.

Alarm relay service module 40 includes a maintenance interface 41, a reference oscillator 42, a clock divider buffer 44, DC to DC converters 46 and 48, a voltage monitor 50, a field programmable gate array 52, and relays 54. Maintenance interface 40 provides access to maintenance functions and capabilities within ATM switch 20. Maintenance interface 40 couples to other maintenance interface units in other modules of ATM switch 20 through a maintenance interface bus 56. Oscillator 42 and clock divider buffer 44 generate the primary and secondary clocking signals used to drive and synchronize each module within ATM switch 20. DC to DC converters 46 and 48 convert external power to appropriate voltage levels to power each unit within alarm relay service module 34. Field programmable gate array 52 controls relays 54 and cooling fan boost through signals from voltage monitor 50 and external thermo and fan sensors signals.

Input/output modules 22a, 22b, 22c, and 22d each include a line interface unit 24, a connectivity engine 26, and a cell flow processor 28. Each input/output module 22 also includes a processor 60, a maintenance interface unit 62, and a DC to DC converter 64. Line interface 24 provides the necessary signal connectivity between external network connections and ATM switch 20. Processor 60 provides the control and operational capability for input/output module 22. Maintenance interface 62 provides maintenance access and monitoring for input/output module 22. DC to DC converter 64 provides the appropriate voltage levels to power input/output module 22.

Connectivity engine 26 has a different structure depending on the type of input/output module 22. For input/output module 22a, its associated connectivity engine 26a provides a clocking function 70 and a segmentation and reassembly (SAR) unit 72 to convert circuit oriented traffic to and from ATM cells. For input/output module 22b, its associated connectivity engine 26b includes a forwarding engine 76 and an SAR 78 to convert frame oriented traffic to and from ATM cells. For input/output module 22c, its associated connectivity engine 26c includes a policing unit 80 and a utopia unit 82 to transport and monitor cell oriented traffic to and from cell flow processor 88. Though three types of differently oriented traffic configurations are shown, ATM switch 20 may include other input/output modules 22 with associated connectivity engines 26 for converting other types of oriented traffic configurations to and from the unified ATM format.

Cell flow processor 28 on each input/output module 22 includes a to-switch port processor 90 and a from-switch port processor 92. TSPP 90 performs the receive operation of the flow control mechanisms for ATM switch 20. TSPP 90 controls access to input buffers and to switch bandwidth on a per connection basis. TSPP 90 sends requests and receives grants for switch bandwidth in order to place cells in the internal cell format onto cell switching fabric 30. FSPP 92 performs the send operation of the flow control mechanisms for ATM switch 20. FSPP 92 controls access to output buffers and link bandwidth on a per connection basis. FSPP 92 receives cells in internal cell format from cell switching fabric 30 and schedules them for placement onto one a plurality of output links at line interface 24.

Switch control module 32 includes an ethernet interface 100 for communication with an external control processor that controls operation of a switching network in which ATM switch 20 resides. A serial interface 102 provides local access to switch control module 32 for communication with a maintenance interface unit 104, processor 106, and Pci unit 108. Maintenance interface unit 104 provides the maintenance access and monitoring functions for switch control module 32 as well as input/output modules and alarm relax service module 40. Processor 106 provides operational control for the external communications to and from switch control module 32. A DC to DC converter 110 performs the appropriate voltage level shifting to power switch control module 32. Switch control module 32 also includes a cell flow processor 28 similar to cell flow processors within input/output modules 22. Cell flow processor 28 includes a TSPP 90 and an FSPP 92 to receive and transmit cells in the internal cell format from and to the local processor subsystem. Segmentation and restructuring unit 112 performs the conversion between ATM cells and the control processor signaling protocol and a frame format. These frames can then be transmitted and received to and from the external control processor through external interface 100.

Cell switching fabric 30 resides within switch control module 32 and includes a bandwidth arbiter 114, a plurality of multipoint topology controller 116, and a data crossbar 117. Bandwidth arbiter 114 decides which input/output module 22 ports have access to switch bandwidth. Bandwidth arbiter 114 accumulates and arbitrates transfer requests from each input/output module 22. Bandwidth arbiter 114 controls the data crossbar 117 interconnect on a per cell time basis and dynamically schedules momentarily unassigned bandwidth and resolves multipoint-to-point bandwidth contention. Multipoint topology controllers 116 maintains and accesses topology states for each connection and controls fan in and fan out of multipoint connections in order to centralize state information needed for multipoint topologies. Switch control module 32 also includes switch manager software 118 that provides switch control, signaling, inter-networking, diagnostics, and management of ATM switch 20. Cell flow processors 28 within each input/output module 22 and within switch control module 32, along with data crossbar 117, bandwidth arbiter 114, multipoint topology controller 116, and switch manager 118 all within switch control module 32, forms a distributed ATM cell switch within ATM switch 20.

Preferably, each input/output module 22 represents a port that can support up to 8 output links at each line interface 24 plus a local processor link. Each multipoint topology controller 116 supports connections for four cell flow processor (TSPP/FSPP pairs) 28 ports. Each bandwidth arbiter 114 supports four multipoint topology controllers 116 and thus has a capability of handling sixteen ports. ATM switch 20 may also be configured to support additional output links and ports as desired to satisfy customer demand.

Figure 3:
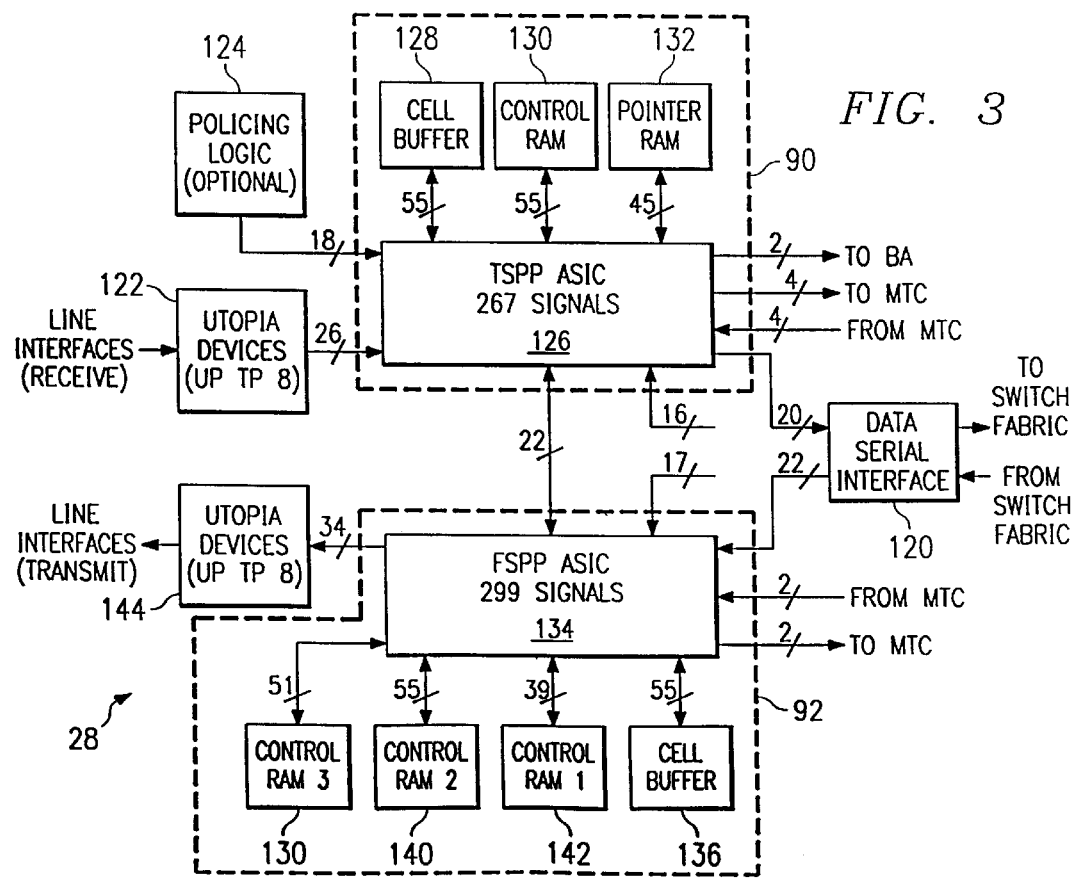
FIG. 3 illustrates a block diagram of a cell flow processor use in the ATM switch.

FIG. 3 is a block diagram of a cell flow processor 28. Cell flow processor 28 includes TSPP 90, FSPP 92, and a data serial interface 120. TSPP 90 includes utopia interface 122 coupled to the connectivity engine 26 of input/output module 22 or switch control module 32. Optional policing logic 124 is used for constant and variable bit rate types. This enforces compliance with a bandwidth specification in order to protect other connections utilizing shared resources. A TSPP unit 126 processes cells received in the internal cell format for storage into a cell buffer 128 and subsequent transmission to cell switching fabric 30 through data serial interface 120. TSPP unit 126 stores and transmits cells in response to tables and information within a control RAM 130. A pointer RAM 132 assists TSPP unit 126 in identifying specific location of cells within cell buffer 128. TSPP unit 126 communicates with bandwidth arbiter 114 and multipoint topology controller 116 in order to coordinate cell transfers from cell buffer 128 to data serial interface 120 and cell switching fabric 30.

FSPP 92 includes an FSPP unit 134 that receives cells from cell switching fabric 30 through data serial interface 120 for temporary storage within a cell buffer 136. FSPP unit 134 stores and schedules cells within cell buffer 136 under the control and supervision of a QFC RAM 138, a control RAM 1 142, and a control RAM 2 140. Control RAMs 138, 140, and 142 assist FSPP unit 134 in storing cells within cell buffer 136 and extracting cells from cell buffer 136 for transmission to network connections through line interface 24 and connectivity engine 26. A utopia interface 144 is used to transfer cells processed by FSPP unit 134 from cell buffer 136 to connectivity engine 26.

Figure 4:
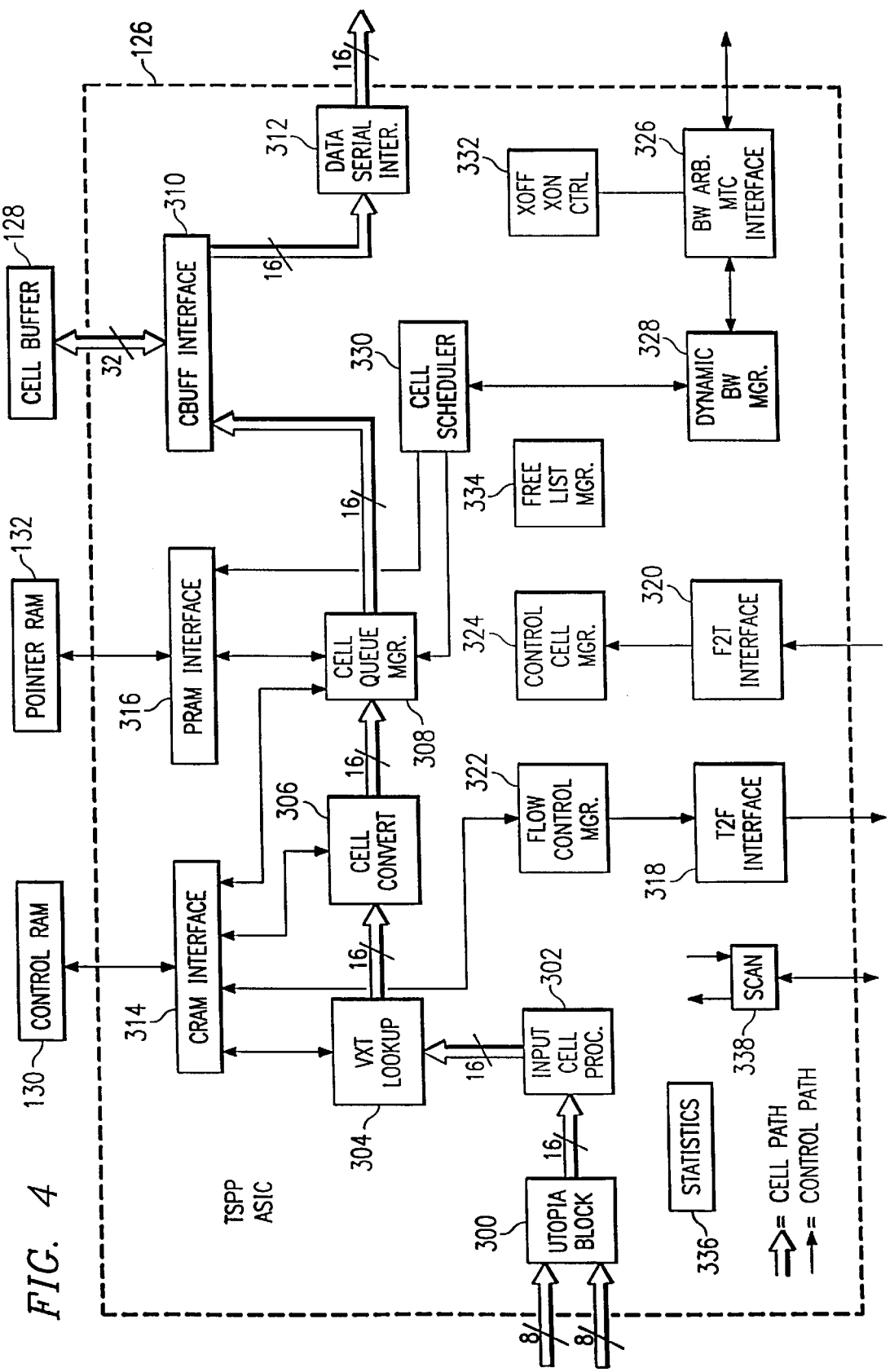
FIG. 4 illustrates a block diagram of a to-switch port processor of the cell flow processor.

FIG. 4 is a block diagram of TSPP unit 126. TSPP unit 126 provides separate paths for cell and control information. Along the cell path, TSPP unit 126 includes a utopia interface 300 that provides the interface between TSPP 90 and the line side of input/output module 22. Input cells pass through utopia interface 300 to input cell processor 302. Input cell processor 302 performs the conversion of the ATM cell into the internal cell format of ATM switch 20. The internal cell format generated by input cell processor 302 proceeds to a virtual translation table lookup unit 304 where a particular connection is associated with specific data structures within TSPP unit 126. Virtual translation table lookup unit 304 verifies that the particular cell belongs to a valid connection and assigns that cell a specific queue number. The specific queue number is used to point to a queue descriptor which contains the state information pertaining to that connection. The appropriate state information is placed into the incoming cell at a cell converter 306 prior to processing by a cell queue manager 308. Cell queue manager 308 prepares the incoming cell for storage within cell buffer 128 through a cell buffer interface 310. The queue number for the cell is placed within a scheduling list that is processed to subsequently transmit the cell from cell buffer 128 through cell buffer interface 310 to cell switching fabric 30 via a data serial interface 312.

For the control path, TSPP unit 126 includes a control RAM interface 314 to provide access to virtual translation table entries, scheduling list descriptors, and queue descriptors within control RAM 130. A pointer RAM interface 316 provides access to pointer RAM 132. Pointer RAM 132 includes list pointers, queue pointers, a switch allocation table, and cell buffer pointers. A T2F interface 318 and an F2T interface 320 provide for communications between TSPP unit 126 and FSPP unit 134. Information passing between TSPP unit 126 and FSPP unit 134 includes the link flow control for ATM switch 20. A link flow control manager 322 is responsible for generating and forwarding the link control information to FSPP unit 134. The link flow control is implemented by means of resource management (RM) flow control cells. When a fixed number of cells have been transferred by TSPP unit 126 from a queue, FSPP 134 will be informed so that it can notify upstream nodes the TSPP 126 can now receive more cells. On the other hand, when RM flow control cells are received at TSPP unit 126 at the upstream node, the corresponding upstream FSPP unit 134 has to be notified so that more cells can be sent out.

A control cell manager 324 handles control cells forwarded from switch control module 32 through FSPP unit 134. Control cells are used to program the data structures associated with TSPP unit 126. There are a variety of different types of control cells including incrementing, list, offset, load, and fill. The increment control cell allows large chunks of memory to be filled with the same data. List control cells allow for reading and writing to specific memory locations in either TSPP 90 or FSPP 92. The offset load control cell can be used to load the switch allocation table within pointer RAM 132 by writing to a set number of arbitrary memory locations with the same data. The fill control cell is used to perform nine consecutive read or write accesses to a block of memory locations. When a control cell arrives at FSPP unit 134, the control cell is forwarded to TSPP unit 136 unless it is destined for FSPP unit 134. Cells destined for TSPP unit 126 are processed accordingly. For any errors that occur in processing, or for all read operations, the control cell is returned to the originating switch control module 32. Most control cell operations require a control acknowledge cell to be sent to confirm that the targeted FSPP/TSPP received the control cell. Control acknowledge cells are enqueued and treated like any other cell for scheduling and routing through cell switching fabric 30 using the standard mechanisms. Control registers may be programmed through scan for the purpose of initializing or diagnosing the internal state of TSPP 92.

TSPP unit 126 also includes bandwidth arbiter/MTC interface 326 that allows for communications between TSPP unit 126 and bandwidth arbiter 114 and multipoint topology controller 116. A dynamic bandwidth manager 328, in response to information received from either bandwidth arbiter 114 or multipoint topology controller 116 through bandwidth arbiter/MTC interface 326, schedules dynamic bandwidth through a cell scheduler 330 for those cells which have not been allocated appropriate bandwidth. An XOFF/XON controller 332 provides the status for cell enqueueing capabilities of all FSPP units 134 within ATM switch 20. A free list manager 334 keeps track of available lists within TSPP unit 126. A statistics unit 336 maintains counters for each unit to provide the hardware metering for TSPP unit 126. A scan interface 338 provides external testing access to TSPP unit 126.

TSPP unit 126 also has a two-cell input mode that can be used to insert OAM cells into a connection without having to change the connection's topology, i.e. change from a point-to-point to a multipoint-to-point connection. If a queue in TSPP unit 126 pointed to by virtual translation table look up unit 304 has the two-cell mode bit set, then the first cell payload has the outgoing ATM header and the second cell payload has the outgoing cell payload. When the two cells are formed into a single internal cell format, the incoming ATM header is discarded. Cells in connections using two-cell mode can be received by TSPP unit 126 intermixed with other incoming cells. The CLP bit is used as a sequencing state check with the CLP set to zero for the first cell and the CLP set to one for the second cell. If TSPP unit 126 receives a cell in two cell mode that is out of sequence, it will discard the cell. Multiple connections using two-cell mode cannot be intermixed when transmitting to TSPP unit 126.

There are two major data structures used by TSPP unit 126—a queue and a list. A queue is used to manage buffers and consists of a group of one or more buffered cells organized as a FIFO manipulated as a linked list using pointers. Incoming cells are added, or enqueued, to the tail of the queue. Cells which are sent to cell switching fabric 30 are removed, or dequeued, from the head of the queue. The sequence of cells sent to cell switching fabric 30 is identical to that in which they arrived, though not over the same time intervals. A list is used to manage bandwidth and consists of one or more queue numbers organized as a circular list manipulated as a linked list structure using pointers. Queue numbers are added to a tail of the list and removed from a head of the list. In addition to being added and removed, queue numbers can be recirculated on a list as long as the associated queue still contains a cell. Recirculation takes place by removing a queue number from the head of the list and adding the queue number to the tail of the list. This results in round robin servicing of queues on a list.

As an ATM cell is received at utopia interface 300 in TSPP unit 126, input cell processor 302 receives and buffers the ATM cell on its ATM cell input port. The first actions performed by input cell processor 302 is to check the header for errors and then to check that the cell is associated with a valid connection. Cell header integrity is verified by computing the header error check (HEC) on the header bytes and then comparing the computed HEC to the HEC in the incoming cells header. Input cell processor 302 validates the VPI/VCI field of the ATM cell and converts the ATM cell into the internal cell format.

Virtual translation table lookup unit 304 uses the VPI/VCI fields specified in the cell header of the internal cell format as an index into the virtual translation table contained within control RAM 130.. Virtual translation table lookup unit 304 will check to see if it recognizes this connection as one that has been set up by the control software. If it recognizes this connection, then this cell will be assigned a queue number by virtual translation table lookup unit 304 and a list number through its corresponding queue descriptor. If it does not recognize this connection, then this cell will either be dropped or assigned an exception or special handling queue number. Normally, the exception queue number would be set up to route unrecognized cells to switch control module 32 for further parsing.

After a cell is assigned a queue number from the virtual translation table, cell converter 306 will look at the corresponding queue descriptor for further information on how to process the cell. Cell queue manager 308 then attempts to assign a buffer for this cell. If a buffer is available, cell queue manager 308 enqueues the cell number to the tail of its queue and the cell is written out to cell buffer 128 through cell buffer interface 310. If there is no buffer available, the cell is dropped and a statistic is updated.

TSPP unit 126 through cell scheduler 330 transfers cells from cell buffer 128 to one or more FSPP units 134 over cell switching fabric 30. The bandwidth used for such transfer can either be preassigned or dynamically assigned. Allocated bandwidth is managed using a timeslotted frame concept. A switch allocation table within pointer RAM 132 is used to manage the allocated bandwidth. All TSPP units 126 in ATM switch 20 are synchronized such that they are all pointing to the same offset in the switch allocation table at any given cell time. Each cell time, cell scheduler 330 looks at the switch allocation table entry for that cell time. A switch allocation table entry is either invalid or points to a list of queues called a scheduling list. If the switch allocation table entry is invalid, that cell time is made available to bandwidth arbiter 114 for use in assigning dynamic bandwidth. The allocated cell time that is given up may be used by any TSPP unit 126 within ATM switch 20 as determined by bandwidth arbiter 114. If the switch allocation table entry contains a valid scheduling list number, cell scheduler 330 will use the first queue on the list as the source of the cell to be transferred during that cell time. If the list has no queue entry available, this cell time is made available to bandwidth arbiter 114 for assignment as dynamic bandwidth.

Dynamic bandwidth cell times are managed using a list of scheduling lists. TSPP unit 126 uses a structure consisting of a plurality of dynamic bandwidth lists. The majority of these lists are used exclusively for point-to-point lists and each are assigned to one of the possible cell switching fabric 30 output ports. Other lists are used for point-to-multipoint connections. If a particular connections buffer depth exceeds the cell depth increasing threshold, the scheduling list for that connection will be added to the dynamic bandwidth list corresponding to the appropriate output port. Cell ordering will still be preserved since cells are removed from the queue in a first in first out fashion no matter whether allocated or dynamic bandwidth is used. All of the queues in each dynamic bandwidth list will share in a round robin fashion the available dynamic bandwidth for that port. At each cell time, TSPP unit 126 will be assigned either allocated bandwidth or dynamic bandwidth. TSPP unit 126 will use this information in deciding which connection to use in order to supply the particular cell that will be transferred during that cell time.

For cell scheduling, TSPP unit 126 transfers to multipoint topology controller 116 a scheduling list number generated from the switch allocation list or a dynamic list. Multipoint topology controller at the originating TSPP unit 126 sends an inquiry to the destination FSPP unit 134 through its associated multipoint topology controller 116. If the destination FSPP unit 134 has available buffer space, this indication is routed through multipoint topology controllers 116 to the originating TSPP unit 126 to allow the origination TSPP unit 126 to begin cell transfer through data crossbar 117 to the destination FSPP unit 134 for cell enqueuing.

Figure 5:
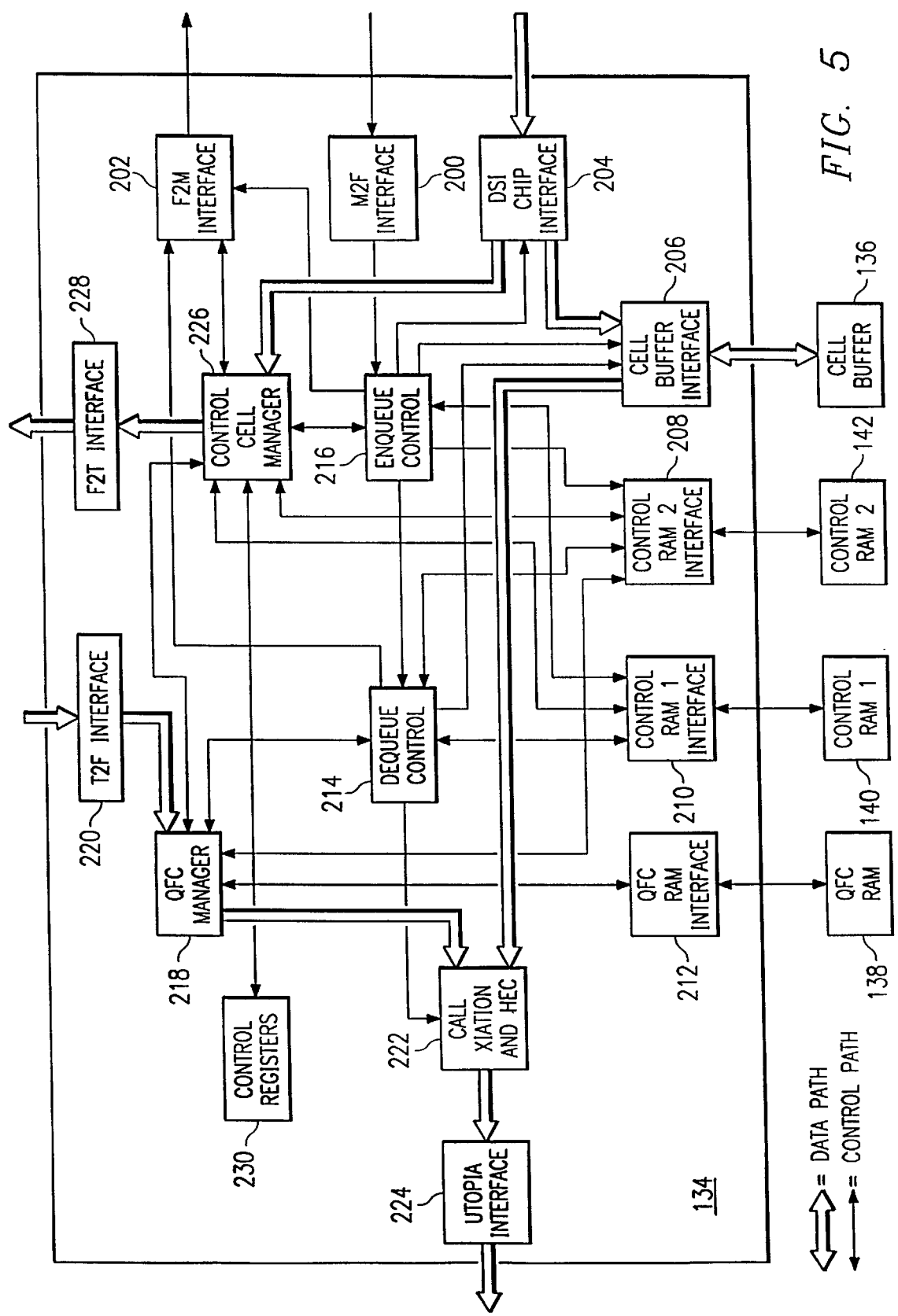
FIG. 5 illustrates a block diagram of a from-switch port processor of the cell flow processor.

FIG. 5 is a block diagram of FSPP unit 134. FSPP unit 134 includes an M2F interface 200 that receives control information transmitted by multipoint topology controller 116 prior to that cell being transmitted to FSPP 92. This control information, frequently referred to as a probe or as probe data, indicates whether the cell is an allocated cell with scheduled bandwidth through cell switching fabric 30 or a dynamic cell with arbitrated bandwidth through cell switching fabric 30. The control information, by use of a multi queue number (MQN), indicates the queue or queues upon which the cell is to be enqueued. This control information allows FSPP 92 to determine whether it has sufficient resources (such as queue space, buffer space, bandwidth, etc.) to receive the cell.

M2F Interface 200 also participates in internal switch flow control through an XOFF/XON protocol. An XON grant (XG) bit is used to communicate the acceptance of an XON from TSPP 90 to FSPP 92 over M2F interface 200. An F2M interface 202 allows for control information to be sent from FSPP unit 134 to its corresponding multipoint topology controller 116. If FSPP unit 134 does not have the resources to receive a cell, an XOFF indication is transmitted to multipoint topology controller 116 through F2M interface 202. The absence of an XOFF signal indicates that resources are available at FSPP unit 134 and the cell can be received through cell switching fabric 30. Once an XOFF signal is sent for a connection, transmission for that connection is generally discontinued until the connection receives an XON signal. When FSPP unit 134 sends an XOFF signal, it marks the queue for that connection so that when resources become available (i.e. cells are transmitted from the queue) an XON signal can be sent for that connection. The XON signal is sent to multipoint topology controller 116 through F2M interface 202. Once a cell has been probed and there has been no XOFF signal sent through F2M interface 202, the cell is transmitted through cell switching fabric 30 and received at FSPP unit 134 through a DSI chip interface 204.

FSPP unit 134 includes four external RAM interfaces, a cell buffer interface 206, a control RAM 2 interface 208, a control RAM 1 interface 210, and a QFC RAM interface 212 in order to control transfer of cells and operational information to and from the respective external RAMs. Control RAM 1 140, control RAM 2 142, and cell buffer 136 are used to enqueue cells received from cell switching fabric 30 and dequeue cells out towards connectivity engine 26 and line interface 24 for transport to external network connections. Control RAM 1 140 and control RAM 2 142 contain the information required to implement the queues, dynamic lists, and preferred lists necessary to provide the appropriate functions for FSPP unit 134. Cell buffer 136 is where the actual cells are buffered while they await transmission. QFC RAM 138 is part of the flow control mechanism from one ATM switch 20 to another within a network. QFC RAM 138 primarily contains storage for cell forward records received from TSPP 90 and is accessed during the generation of flow control update cells.

The external RAM interfaces control the respective RAMs to allow the interleaving of both a cell enqueue and a cell dequeue during a single cell time. Because both the enqueuing and the dequeuing of cells are pipeline processes, the control structures of multiple queues are simultaneously active in different pipeline stages. If cells are received back to back for the same queue, then that queue may be active in multiple pipeline stages. If a cell is enqueued and dequeued from a queue such that the enqueue and dequeue pipeline stages overlap, then that queue will be active in both the enqueue and dequeue pipelines. To conserve control RAM bandwidth by avoiding the reading and writing of all active control structures each cell time, and to allow queues to be active at multiple stages of the enqueue or dequeue pipeline, active control structures are cached internal to the respective external RAM interfaces.

A dequeue controller 214 and an enqueue controller 216 are responsible for specifying the sequence of operations necessary to both enqueue and dequeue cells. This includes providing the addresses of operations to control RAM 1 interface 210, control RAM 2 interface 208, and cell buffer interface 206 to access the desired structure stored therein. Dequeue controller 214 is also responsible for scheduling the output link.

FSPP unit 134 includes a QFC manager 218 that receives external flow control information from TSPP 90 through a T2F interface 220. Two types of information are received, RM flow control forward records and RM flow control dispatch records, and within each type there are two levels of information, connection and link. QFC manager 218 sorts out the information by type and level and processes it accordingly. Dispatch records contain cells that are to be applied locally. Connection level RM flow control dispatch records are sent to control RAM 2 interface 208 for handling while link level RM flow control dispatch records are handled within QFC manager 218 in its link level resource section. Forward records are buffered in memory within QFC manager 218. QFC manager 218 manages the connection level RM flow control forward records as link lists, with one entry per connection and one link list for each of the eight links. Link level RM flow control forward records are managed as one entry per link. QFC manager 218 processes RM flow control forward records into RM flow control update cells and arbitrates link bandwidth for these RM flow control update cells.

FSPP unit 134 includes a cell translation and header error control unit 222 that verifies the internal format of a cell to determine if the cell has been corrupted while in cell buffer 136. Cell translation and header error control unit 222 also reformats the cell from the internal cell format to the utopia interface format of an ATM cell. For two cell mode operation, the cell is reformatted into two ATM cells. Reformatting of the cells includes setting the VPI and/or VCI of the outgoing cell and generating a new HEC for the cell. Input to cell translation and header error control unit 222 can be selected either from cell buffer interface 206 in the case of normal cell transmission or from QFC manager 218 in the case of RM flow control update cell transmission. The means by which outgoing VPI/VCI is translated depends on the operating mode set for an individual connection within its queue descriptor. Once a cell has been reformatted, it is transferred to a utopia interface 224 that provides the means to place the ATM cell onto a physical line out. Preferably up to eight utopia devices may be attached to a single utopia interface 224. Using two mutliplexer/demultiplexer chips, utopia interface 224 may support eight output links and an additional microprocessor link.

FSPP unit 134 includes a control cell manager 226 that receives control cells from DSI chip interface 204. Control cells received from DSI chip interface 204 are not stored in cell buffer 136, but are internally buffered, decoded, and executed by control cell manager 226. Once a control cell is executed, the response to that control cell (either a write acknowledge or a read response) is forwarded over an F2T interface 228 to TSPP 90 for return to switch control module 34. If a control cell is for TSPP 90, it is forwarded unaltered through F2T interface 228. Limited internal control cell buffering is available in FSPP 92 and TSPP 90. If this buffering is full, the reception of additional control cells will be deferred by sending a reject through F2M interface 202. Control cells may be used to read and write to control registers 230 within FSPP unit 134. Control registers 230 contain the state information that programs the internal operation of FSPP 92. Control registers may be programmed through scan for the purpose of initializing or diagnosing the internal state of FSPP 92.

The time it takes to process a single cell is called one cell time. For a 50 MHZ clock, one cell is processed each 32 clock cycles or 640 nanoseconds. Cell enqueuing is pipelined in five stages, where four of these stages occur within FSPP unit 134. During stage zero, the cell control information, or probe, is sent to M2F interface 200 from multipoint topology controller 116. During stage one, FSPP unit 134 checks its control RAMs to determine if there are sufficient resources to enqueue the cell. If FSPP unit 134 cannot enqueue the cell, it returns an XOFF signal through M2F interface 200. The absence of an XOFF signal indicates that this cell can be enqueued. During stage two, FSPP unit 134 waits for the cell to arrive. During stage three, the cell is received from cell switching fabric 30 at DSI chip interface 204. During stage four, the cell is written into cell buffer 136 and the control RAMs are updated. The five stage cell enqueuing pipeline process occurs over five cell times.

The internal cell format is 56 bytes in length. The HEC portion of the ATM cell header has been dropped from the 53 byte ATM cell. Two bytes of cyclic redundancy check have been added to the end of the cell and two more bytes recording the port and link over which the ATM cell initially arrived have been added to the end of the cell. The cell code is used for checking consistency of the probe information, what FSPP 92 is told to expect and the actual cell that arrives. There are three values of cell code, 0XC for a control cell, 0XD for a data cell, and 0X2A for a short cell. The GFC and VPI fields remain unchanged until just before transmission by FSPP unit 134 where they are translated to the appropriate values for the output link. The VCI field remains unchanged through ATM switch 20 for virtual path services, but like the VPI field, the VCI field may be translated before transmission for virtual channel services. A new-HEC is generated and inserted into the outgoing cell.

Cell buffer 136 is divided into cell buffer locations, each capable of holding a single cell. As a cell is received from cell switching fabric 30, it is stored in an individual cell buffer location and the cell buffer location is indicated as being full. As that cell is read from its cell buffer location and transmitted, that cell buffer location becomes free. Cells are received from a variety of sources and connections and the order in which cells are transmitted is nonsequential with respect to the order in which cells are received. Over time, the position of full and free cell buffer locations becomes distributed throughout cell buffer 136.

Cell buffer locations within cell buffer 136 are pointed to using cell numbers. The starting address of a cell buffer location is derived from the cell number and each cell buffer location has a unique cell number pointing to that cell buffer location within cell buffer 136. The total number of cell buffer locations is divided into twenty-nine separate cell buffer pools. Each cell buffer pool. is dedicated to an internal cell scheduling resource. Twenty-four cell buffer pools are for point-to-point dynamic traffic, four cell buffer pools are for point-to multipoint variable bit rate and available bit rate traffic, and one cell buffer pool is used for remaining allocated traffic scheduling mechanisms. When the number of cell buffer locations in a cell buffer pool are totally consumed, the cells are no longer accepted for that cell buffer pool. This allows cell buffer locations to be either reserved, as is needed for allocated traffic, or shared, as is convenient for dynamic traffic.

Each cell buffer pool is implemented as two internal registers. The cell buffer pool count register contains the current number of cell buffer locations in use for that cell buffer pool. The cell buffer pool limit register contains the maximum number of cell buffer locations allowed for that pool. Since the cell buffer pools are implemented as counters, an individual cell buffer location may be part of any pool. The specific cell buffer pool used is determined by the type of traffic received, allocated or dynamic, and the dynamic scheduling resource indicated by the queue descriptor.

Cell numbers are manipulated to place cell buffer locations onto queues. When a cell buffer location in cell buffer 136 is written with a cell, the cell number pointing to that cell buffer location is then placed on a queue. Cells are transmitted from queues in the order in which they are received, i.e. the first received is the first transmitted. Queues are implemented as a linked list of cell numbers. Each cell on the queue points to the next cell on the queue using its cell number as a pointer. Each queue has a separate structure, called the queue descriptor, that is maintained in control RAM 2 142 to point to the head and tail of the queue. The queue descriptor contains other fields that control the scheduling and transmission of the cell. A cell is added to a queue by enqueuing its cell number to the tail of the queue. A cell is removed from the queue by dequeuing its cell number from the head of the queue. Each queue transmits to one and only one output link. Transmission to multiple output links requires placing the cell number on multiple queues.

A special queue, called the free queue, is used for free cell buffer locations. The free queue is structured much as other queues in that it is a linked list of cell numbers. In this case, however, the cell numbers point to those cell buffer locations within cell buffer 136 that are free and available to receive active cells. The free queue has a free queue descriptor with pointers to both the head and the tail of the free queue. The descriptor has head and tail pointers and a count register, similar to an ordinary queue descriptor, except that it is maintained internal to FSPP unit 134 due to the regularity with which the free queue is accessed. The free queue descriptor does not contain the scheduling and transmission fields necessary for ordinary queues. If cell buffer 136 is empty, the free queue will be full and if cell buffer 136 is full, the free queue will be empty. Upon initialization, all cell numbers are added to the free queue since cell buffer 136 is empty. Once in operation, the free queue must have at least one cell number in order for FSPP 90 to receive a cell in cell buffer 136.

There is a queue descriptor maintained for each queue which points to the head of the queue and the tail of the queue. This queue descriptor also contains other data related to the queue, such as a count of the number of dynamic and allocated cells in the queue, RM flow control information for flow control, the output link used for the queue, and other information regarding the quality of service of the queue. The queue descriptors are maintained in control RAM 2 142, except for the head of queue pointers which are in control RAM 1 140 and are accessed using the queue number as an index.

Figure 6:
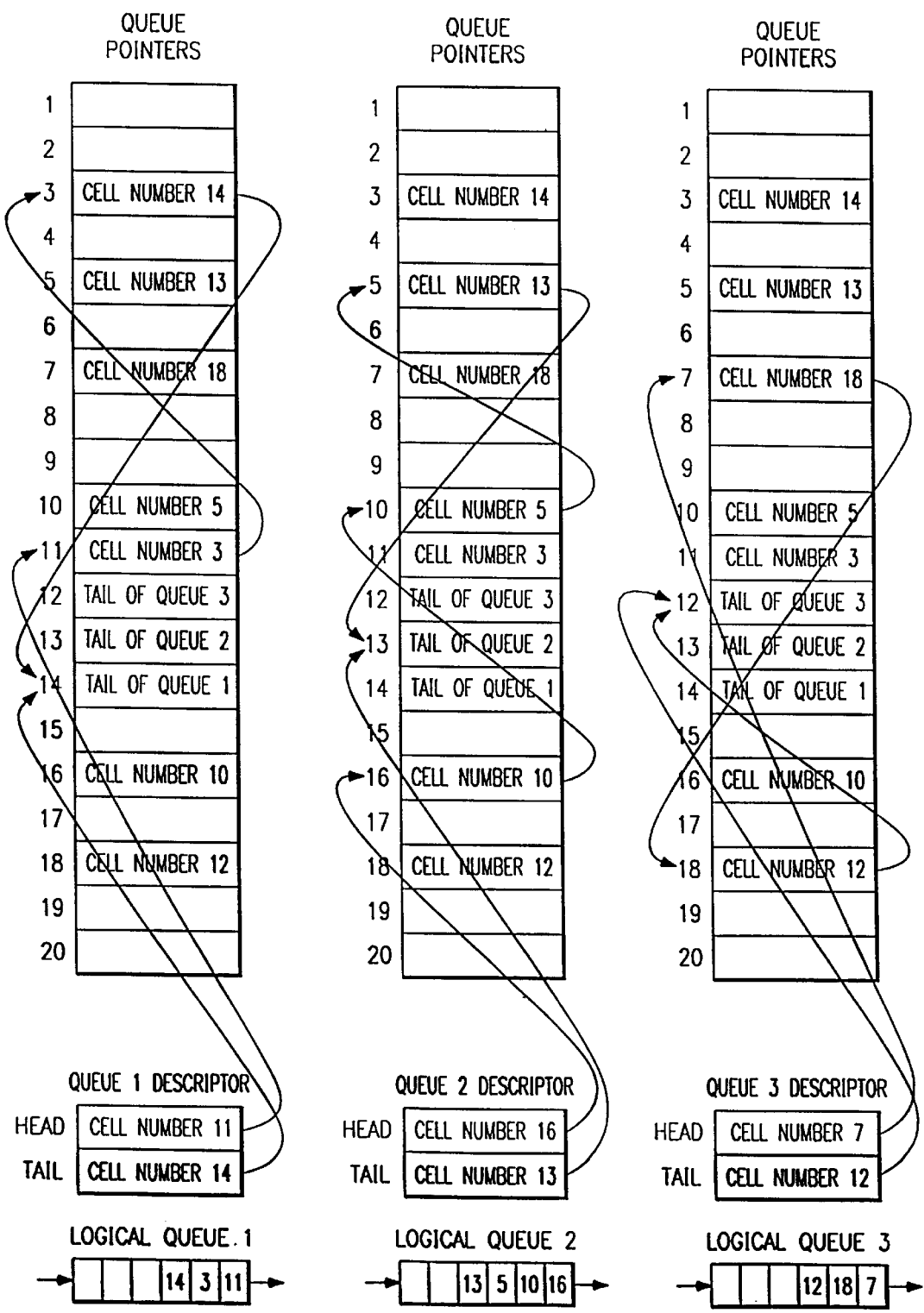
FIG. 6 illustrates the queuing system within the ATM switch.

The linked list making up a queue is implemented as a set of pointers in control RAM 1 140 such that each cell buffer location has one entry. The pointers are an index using the cell number and each entry contains a cell number for the next cell within the link list such that each cell number can point to a second cell number. FIG. 6 shows how cell numbers, queues, and queue pointers relate to one another.

Preferably, there are eight sets of queued pointers, one for each output link. The free queue shares the queue pointers for the first output link along with local microprocessor output link 9. The cell number of the first entry, or head of the queue is stored in control RAM 1 140 for each queue and is accessed using the queue number and a base offset. The queue descriptor within control RAM 2 142 holds a cell number of the last entry or tail of the queue for each queue. The cell number of the head of the queue is used to index into the queue pointers and read the cell number of the second entry in the queue. Likewise, the cell number of the second entry is used to index into the queue pointers and read the cell number of the third entry and so on until the cell number is equal to the cell of the last entry or tail of the queue. The queue descriptor also contains a count of the number of cells on the queue. The queue pointers themselves allow a range from all the cells to none of the cells to be on an individual queue. The number of cells on an individual queue is limited by the allocated/dynamic cell limit contained in the queue descriptor. The maximum limit is 127 allocated cells and 127 dynamic cells.

To receive a cell, a cell number is first removed from the head of the free queue. The cell buffer location corresponding to the cell number removed from the head of the free queue becomes full as the incoming cell becomes associated with that cell number. The cell number is then added to the tail of a respective queue. To transmit a cell, a cell number is first dequeued from the head of a queue. The cell buffer location associated with that cell number becomes free as the cell is read. The cell number is then added to the tail of the free queue. To remove a cell from a queue, the cell number is obtained from the head of the queue in the queue descriptor. It is then used to index into the queue pointers to find the cell number of the second entry in the queue. The cell number of the second entry of the second queue entry then becomes a new head of the queue in the queue descriptor. To add a cell to a queue, the cell number of the tail of the queue is obtained from the queue descriptor. The cell number of the tail of the queue is then used to index into the queue pointers where the cell number to be added is written. The added cell number then becomes the new tail of the queue in the queue descriptor.

The queue pointers for output link 1, local microprocessor output link 9, and the free queue, share the same queue pointer. This is possible since a cell number may be on only one queue on output link 1 or output link 9 or the free queue at one time. Since cell numbers on the free queue are never on any other queue, the free queue could share the queue pointers of any output link. To simplify, the free queue always uses the queue pointers for output link 1. Also, the queue pointers for output link 9 are shared with those for output link 1, since output link 9 is restricted. The same cell number may be on different output links 1–8, where there is a separate set of queue pointers for each output link.

A separate set of queue pointers is required for each output link. In the case of multiple output links, a cell number may be enqueued on multiple queues, one queue for each output link for which the cell is destined. Each of these queues can have its own sequence of cell numbers. The cell number following or proceeding a given cell number can be different on each of these queues. To allow a cell number to be linked differently on each of its queues, a different set of queue pointers is used for each output link. Each of the queues is destined for a different output link, so one set of queue pointers is used for each output link. All the queues destined for the same output link share a set of queue pointers.

Once a cell is placed on a queue, that queue must then be scheduled for transmission. This is done by placing the queue number of that queue on a list. Lists are the means by which individual queues are selected for transmission. There are different types and priorities of lists within FSPP 92. Lists behave much as queues, except that a queue is a linked list of cell numbers while a list is a linked list of queue numbers. With queues, cell numbers are serviced in order, i.e the first cell number added to a queue is the first removed. With lists, queue numbers are serviced in order, i.e. the first queue number added to the list is a first removed. Lists are implemented as a linked list of queue numbers. Each queue number on the list points to the next queue number on the list using the queue number itself as a pointer. Each list has a separate structure, called the list descriptor, maintained internal to FSPP unit 134 to point to the head and tail of the list. A queue is added to a list by enlisting its queue number to the tail of the list. A queue is removed from a list by delisting its queue number from the head of the list. Each list transmits to one and only one output link.

There are two categories of traffic to be scheduled for transmission, allocated traffic and dynamic traffic. Allocated traffic has scheduled bandwidth through switch fabric 30 and has high priority. Dynamic traffic does not have scheduled bandwidth through switch fabric 30 since it receives its bandwidth as a result of arbitration for bandwidth unused by allocated traffic. Cell control information, the probe, sent to FSPP unit 134 through M2F interface 200 includes an S bit that determines whether the cell to be received is allocated or dynamic.

Two types of lists, preferred lists and dynamic lists, are used for scheduling the two types of traffic. The queue numbers of allocated traffic, with higher priority, are placed on a preferred list. The queue numbers of dynamic traffic, with lower priority are placed on a dynamic list. Entries on the preferred list are serviced before entries on the dynamic list. Some queues may have mixed service traffic with both allocated and dynamic cells. In this case that queue number is placed on both the preferred list, for the allocated cells received, and on a dynamic list, for the dynamic cells received. Whether dynamic cells arrive first or the allocated cells arrive first, the queue numbers on a preferred list will be scheduled and removed first before the queue numbers on a dynamic list. The cells are still transmitted in order, however, since cell numbers on the queue remain in order and cell numbers are always removed from the head of the queue.

Once a queue number has been added to a list, either a preferred list or a dynamic list, it remains on that list as long as the queue has more cells of the appropriate type, allocated for the preferred list and dynamic for the dynamic list. When a queue number makes it to the head of the list, that queue becomes the next queue within the list from which a cell is transmitted. When the cell is transmitted, the queue number is removed from the head of the list and the count of either allocated cells for a preferred list or dynamic cells for a dynamic list is decremented within the queue descriptor associated with that queue. If the decremented counter is non zero, the queue number return to the tail of the list. Otherwise it is dropped from the list. By servicing the queue number from the head of the list and returning it to the tail of the list, the queues within the list receive round robin scheduling. The way lists are constructed, any number of queues from no queues to all the queues can be on an individual list at a given time.

In order to provide delay bins through the switch to differentiate various levels of service, four priorities of preferred lists are provided for each output link. These four priorities are deemed preferred list 1A–1D for output link 1 through preferred list 8A–8D for output link 8. Output link 9 only has a preferred list 9A. Each output link is scheduled independently, so there is no interaction between the preferred list for different links. Within a link, the priority decreases from preferred list 1A with the highest priority to preferred list 1D with the lowest priority. Newly received cells in a higher priority preferred list are transmitted before previously received cells in a lower priority preferred list. All the preferred lists with allocated traffic for a link are scheduled with priority over dynamic lists with dynamic traffic for that link. The preferred list used by a queue is chosen based on the output link to which the queue is assigned. The output link, as well as the priority of the preferred list to be used, are chosen by fields in the queue descriptor.

Dynamic lists are means of scheduling dynamic cells. There are three types of dynamic lists and four of each type available in FSPP 92, variable bandwidth rate, available bandwidth rate, and unknown bandwidth rate lists. Each type of list is permanently assigned to each output link for output links 1–8. Output link 9 has no dynamic list. There are two priority levels for each VBR/ABR dynamic list, high for bandwidth not met, and low for bandwidth met or exceeded. All queues receiving dynamic cells belong to a dynamic list as provided in the queue descriptor.

The linked list of queue numbers making up a list is implemented as a set of pointers in control RAM 1 140. A queue may be placed on only one preferred list and only one dynamic list but may be placed on both if it contains both allocated and dynamic traffic. For this reason there is a separate set of preferred list pointers and dynamic list pointers. All preferred lists share the same set of preferred list pointers and all dynamic lists share the same set of dynamic list pointers. Preferred and dynamic list pointers are implemented identically and thus the following implementation details are the same for either the preferred of dynamic list pointers.

The linked list making up a list is implemented as an array in control RAM 1 140 such that each queue has one entry in the array. The array is indexed using the queue number and each element of the array contains another queue number pointing to the next queue in the linked list. By this means, one queue number, indexing the array, is able to point to a second queue number, an element in the array. A separately maintained structure, the list descriptor holds the queue number of the first entry, or head, of the list and the last entry, or tail, of the list. The queue number of the head of the list is used to index into the list pointers and read the queue number of the second entry in the list. Likewise, the queue number of the second entry is used to index into the list pointers and read the queue number of the third entry, and so on until the queue number read is equal to the queue number of the last entry, or tail of the list.

To add a queue to a list, the queue number of the queue being added to the list is written to the list pointer location indexed by the present tail of the list. The queue number of the queue being added then replaces the present tail of the list to become the new tail of the list in the list descriptor. To remove a queue from a list, the present head of the list is used to index into the list pointers to find the queue number of the second list entry. The queue number of the second queue entry then replaces the present head of the list to become the new head of the list in the list descriptor. A preferred list pointer base address register internal to FSPP unit 134 points to the beginning of the preferred list pointers in control RAM 1 140. This enables the preferred list pointers to be located anywhere within the control RAM 1 140 address space. Likewise, a dynamic list pointer base address register internal to FSPP unit 134 points to the beginning of the dynamic list pointers in control RAM 1 140. This enables the dynamic list pointers to be located anywhere within the control RAM 1 140 address space. The list sharing a set of list pointers must be all of the same type, either all preferred lists or all dynamic lists.

FSPP 92 is capable of supporting one, two, four, or eight output links. The actual number of output links is configured at system set up and remains constant for a given FSPP 92. Each cell received from cell switching fabric 30 is placed in a queue for processing. If that cell is intended to be transmitted on multiple output links, then that cell must be placed on multiple queues, one for each output link. The multiple queues on which to enqueue the cell are determined by using a multiple queue number (MQN) and a multiple queue half (MH) bit received through M2F interface 200 to look up multiple FSPP queue numbers from an MQN table. The cell is then enqueued to each of the queues. If there is only one output link, the MQN table only has one location per multiple queue number since the cell will only be enqueued to one queue.

There is only sufficient control RAM bandwidth to enqueue a cell on a maximum of four queues per cell time. This allows transmission on up to four output links. However, FSPP 92 supports eight output links. In the case where a cell is destined for more than four output links, the cell is sent to FSPP 92 twice using TSPP 90 subqueues. Each time the cell is received, it can be enqueued on up to four queues. Sending the cell twice allows a transmission on up to eight output links. The use of the MH bit informs FSPP 92 that a cell will be sent a second time for enqueuing. A side effect of sending the cell to FSPP 90 to twice for more than four output links is that the cell then requires two cell buffer locations.

Once a cell has been enqueued to multiple queues, a mechanism is required to know when the cell has been removed from all of the queues so that its cell buffer location may be returned to the free queue. Cell expiration counters are used for this purpose. There is one cell expiration counter for each cell buffer location. The cell expiration counters are accessed by cell number. When a cell is received, the cell expiration counter for that cell number is written with a count of the number of queues upon which that cell has been enqueued. When a cell is transmitted, the cell expiration counter for its cell number is decremented. If the count is zero before decrementing it, the cell has been transmitted from all the queues and the cell number is returned to the free queue. Stored along with the two bit cell expiration counter is the allocated bit. This bit is set to one if the cell has been dequeued from an allocated list otherwise it is left as is. It is used to decrement the correct buffer pool, allocated or dynamic, when the cell buffer location is returned to the free queue. If it is a one when the cell is returned to the free queue, the allocated buffer pool will be decremented. This ensures that the allocated buffer pools will always be decremented first for multicast connections.

Figure 7:
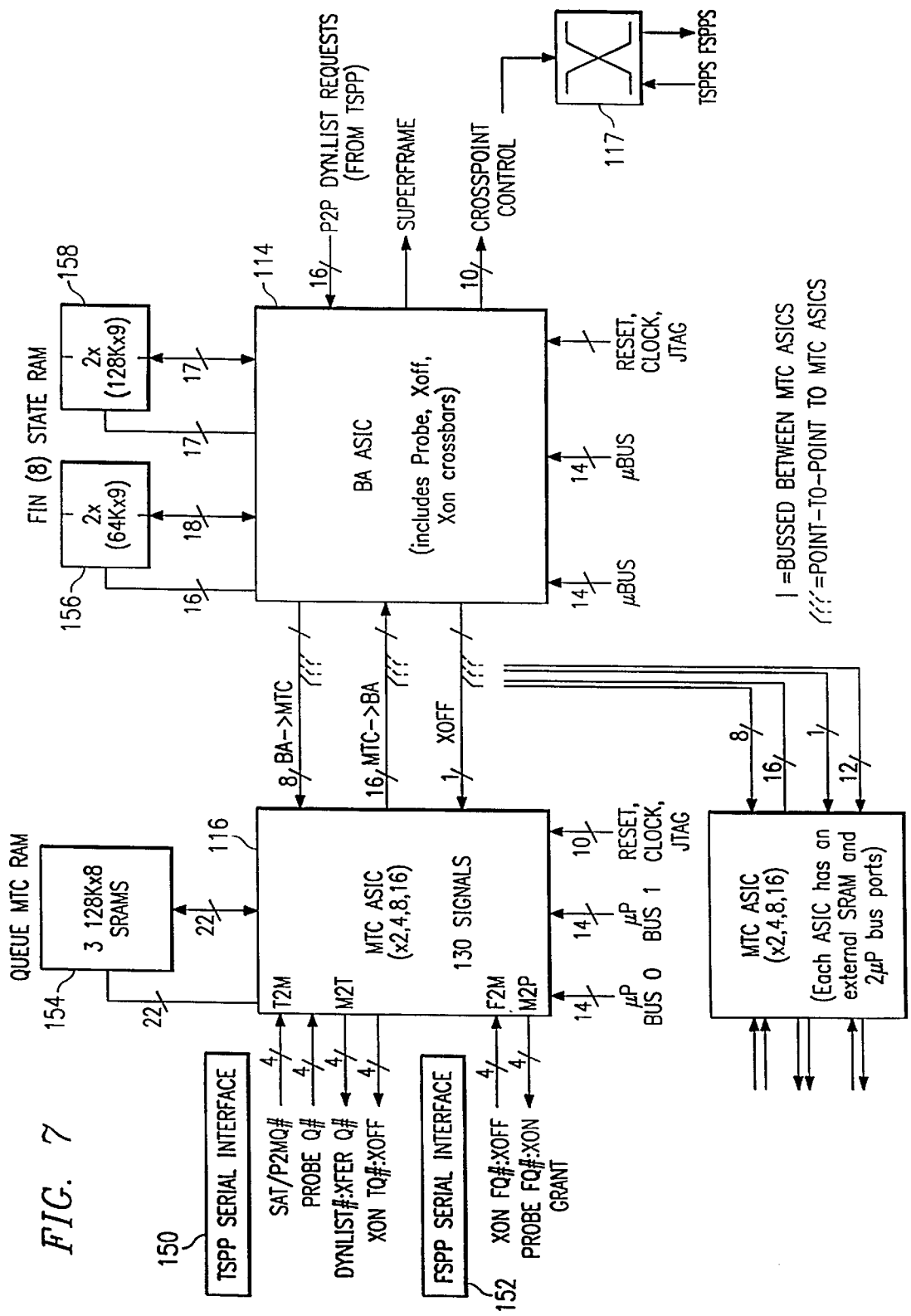
FIG. 7 illustrates a block diagram of a switching fabric used within the ATM switch.

FIG. 7 is a block diagram of a cell switching fabric 30. Cell switching fabric 30 includes a bandwidth arbiter 114, multipoint topology controller 116, and a data crossbar 117. Multipoint topology controller 116 includes a TSPP serial interface 150 for receiving and sending control information to TSPP 90. Multipoint topology controller 116 also has an FSPP serial interface 152 for sending and receiving control information to FSPP 92. Each multipoint topology controller 116 can send and receive control information to and from up to four TSPP 90 and FSPP 92 pairs. Thus, each multipoint topology controller 116 supports up to four ports within ATM switch 20. Each multipoint topology controller 116 has an associated queue MTC RAM 154 for reading and writing appropriate control information. Bandwidth arbiter 114 can interface with up to four multipoint topology controllers 116. Bandwidth arbiter 114 provides control signaling to switch fabric 30 and receives point-to-point dynamic list requests from each TSPP 90. Bandwidth arbiter 114 includes state RAMs 156 and 158 for reading. and writing control information. Data crossbar 117 provides the transfer medium for internal cells from any TSPP 90 port to any FSPP 92 port.

Multipoint topology controller 116 connects port processors to bandwidth arbiter 114 and performs the translations used to implement internal switch flow control for multipoint and point-to-point connections. Multipoint topology controller 116 informs bandwidth arbiter 114 of what output ports are used by the port processors and, for multipoint-to-point connection flows, the fan-in number and subfan-in number. The primary benefit of multipoint topology controller 116 is that it allows for scaling of the number of port processors without impacting the memory requirements of the port processors. Topology information is maintained by multipoint topology controller 116 in a centralized table. Except for the communication of dynamic point-to-point connection requests to bandwidth arbiter 114, multipoint topology controller 116 receives and distributes all communication between TSPP 90 and FSPP 92.

Multipoint topology controller 116 uses a variety of tables to perform look ups unique for each port processor in order to distribute the appropriate communications within ATM switch 20. A TSL2FIN table looks up a fan-in number and subfan-in number as indexed by a scheduling list number received from TSPP 90. The fan-in number and subfan-in number are forwarded to bandwidth arbiter 114 for sorting and arbitration. A TSL2BV table and SQ2BV table are used to look up a bit vector which determines which of the FSPPs 92 are to receive a cell. For point-to-point connections, only a single lookup is required and only a single bit is set in the bit vector. For point-to-multipoint connections, cells may be sent on subqueues which need a second lookup to obtain the bit vector. The first lookup into TSL2BV table obtains a pointer and the pointer is added to the subqueue offset within the SQ2BV table to locate the bit vector. A TSL2FQ/FBCN table is used to look up a forward broadcast channel number for point-to-multipoint connections in response to the scheduling list number received from TSPP 90. An FBCN2FQ table uses the forward broadcast channel number to look up an FSPP multiqueue number. An FQ2TSL/RBCN table is used in multipoint-to-point connection topologies to look up a TSPP scheduling list number from the FSPP multiqueue number. An RBCN/TL table obtains a TSPP scheduling list number from the reverse broad case channel number.

The FIN and subFIN are used by bandwidth arbiter 114 in allocated multipoint-to-point arbitration when more than one TSPP 90 requests transmission to the same FSPP 92. The arbitration is performed to ensure fairness between competing ports. The bit vector is used by bandwidth arbiter 114 to determine which output ports a TSPP is requesting. There are two levels of look up used in determining the bit vector. The first level is either a pointer to the bit vector or a pointer to a subqueue area. The second level occurs in the subqueue area to obtain a pointer to the bit vector. A lookup in the TSL2MQN/FBCN table is done on the first pass of this string through multipoint topology controller 116 coupled to the originating TSPP 90. If the result is a forward broadcast channel number, this information passes as probe data through the multipoint topology controller 116 associated with the destination FSPP 92. Multipoint topology controller 116 at the destination FSPP 92 converts it to an FSSP multiqueue number. The FSPP 92 uses this multiqueue number to probe the queue to see if there was space to enqueue the cell. A look up in the FQ2TSL/RBCN table is done on the first pass of this string through multipoint topology controller 116. If the result is a reverse broadcast channel number, the second pass converts it to a TSPP scheduling list number. TSPP 90 uses this data to XON a list that has previously been XOFFED.

Multipoint topology controller 116 receives and distributes data from a probe, an XON, and an XOFF crossbar located within bandwidth arbiter 114. Routing data to a crossbar involves two trips through a multipoint topology controller 116. The first pass through multipoint topology controller 116 transfers the data to the crossbar and the second trip routes the data back to the destination port. Data may pass through two different multipoint topology controllers 116 or the same one, depending on the route. Multipoint topology controller 116 also provides FSPP 92 with the multiqueue half bit, which is used to support enqueuing a cell onto 8 links by sending it twice within ATM switch 20. The first time through, the MH bit is set to zero and FSPP 92 uses the bottom half of the multiqueue table. The second time through, the MH bit is set to one to allow FSPP 92 to use the top half of the multiqueue table. This is accomplished by setting the cell in different subqueues and comparing that value to a subqueue field that is stored with the multiqueue number.

For allocated point-to-point and point-to-multipoint connection operation, multipoint topology controller 116 receives a serial stream from TSPP 90 that contains the TSPP scheduling list number. Multipoint topology controller 116 looks up the bit vector, FIN, and subFIN associated with the TSPP scheduling list number for transfer to bandwidth arbiter 114. A FIN and subFIN are only valid for multipoint-to-point and multipoint-to-multipoint connections. Bandwidth arbiter 114 does fan-in number arbitration and determines the scheduled traffic bit vector. Dynamic arbitration occurs within bandwidth arbiter 114 during which multipoint topology controller 116 buffers the TSPP scheduling list number. At the correct time in the pipeline, multipoint topology controller 116 uses the buffered TSPP scheduling list number for look up within the TSL2MQN/FBCN table. For point-to-point, a multiqueue number is retrieved. For point-to-multipoint connections, an FBCN index is obtained to determine the multiqueue number. When a multiqueue number is returned, a compare is done on the subqueue bits forwarded by TSPP 90 and the subqueue bits stored within the multiqueue number. If they match, the MH bit is set and returned to the FSPP with the multiqueue number through the probe crossbar of bandwidth arbiter 114. The output of the probe crossbar is routed to the appropriate multipoint topology controllers 116 that couple to the destination FSPPs 92. For a point-to-point connection, a multiqueue number has already been retrieved and is passed through the appropriate multipoint topology controller 116 to the appropriate FSPP 92. For point-to-multipoint connections, the forward broadcast channel number is passed to appropriate multipoint topology controllers 116 coupled to destination FSPPs 92. Multipoint topology controllers 116 at destination FSPPs 92 translate the forward broadcast channel number into a multiqueue number and a subqueue bit is compared to determine if the MH bit is to be set and returned to FSPP 92 (no subqueue compare for NFBCN retrieval on the first pass).

If an FSPP 92 does not have the resources to accept the cell, multipoint topology controller 116 receives an XOFF bit that is passed through to bandwidth arbiter 114 over its XOFF crossbar. The XOFF bits passed through to bandwidth arbiter 114 are routed back to the multipoint topology controller 116 associated with the originating TSPP 90. Multipoint topology controller 116 associated with the originating TSPP 90 sends the sending scheduling list number and XOFF bits to TSPP 90. If the scheduling list number is not XOFFED, TSPP 90 dequeues a cell for transmission to an FSPP 92 over cell switching fabric 30.

For a dynamic point-to-point and point-to-multipoint connections, multipoint topology controller 116 receives a dynamic point-to-multipoint scheduling list number from TSPP 90 when there isn't a scheduled cell to send. Point-to-point connections request dynamic bandwidth by interfacing directly with bandwidth arbiter 114. For the point-to-multipoint connections, multipoint topology controller 116 retrieves the appropriate bit vector, FIN, and subFIN for transfer to bandwidth arbiter 114. Bandwidth arbiter 114 performs fan-in number arbitration for multipoint-to-point and multipoint-to-multipoint connections and determines the scheduled traffic bit vector. Dynamic arbitration occurs in bandwidth arbiter 114 and forwards a winning list number to TSPP 90 through multipoint topology controller 116 if TSPP 90 has been granted access. TSPP 90 determines the scheduling list from the winning list number and forwards this back to multipoint topology controller 116.

Multipoint topology controller 116 now forwards the result of the TSL2MQN/FBCN look up to bandwidth arbiter 114. A multiqueue number is forwarded for point-to-point connections and an FBCN index is forwarded for point-to-multipoint connections. Bandwidth arbiter 114 routes this result through its probe crossbar. The output of the probe crossbar is routed to the multipoint topology controllers 116 coupled to the destination FSPPs 92. FBCNs are translated into multiqueue numbers for point-to-multipoint connections while point-to-point connections already have a multiqueue number for passthrough. Subqueue bit compares are also performed to determine if the MH bit should be set. The multipoint topology controllers 116 at the destination FSPPs 92 receive an XOFF bit if the associated FSPP 92 does not have resources to accept the cell. XOFF bits are passed through multipoint topology controller 116 at the destination FSPP 92 to bandwidth arbiter 114. The XOFF bits passed through bandwidth arbiter 114 are routed back to the multipoint topology controller 116 associated with originating TSPP 90. The multipoint topology controller 116 at the originating TSPP 90 sends the sending scheduling list number to TSPP 90 and the XOFF bits. TSPP 90 will dequeue a cell for transfer through cell switching fabric 30 to a destination FSPP 92 if the scheduling list is not XOFFED.

For point-to-point and multipoint-to-point XON connections, multipoint topology controller 116 at the destination FSPP 92 receives an FSPP queue number from the associated FSPP 92 that has decided to XON a connection. Multipoint topology controller 116 looks up a TSPP scheduling list number and port number or a reverse broadcast channel number for transfer to bandwidth arbiter 114. Bandwidth arbiter 114 arbitrates among the XON requesters. When a multipoint-to-point XON requester is selected, then only it can send an XON message as all ports must look up the reverse broadcast channel number. The number of point-to-point XON messages is determined by the switch size. Bandwidth arbiter 114 routes the reverse broadcast channel number through its XON crossbar for broadcast to all TSPP 90 through appropriate multipoint topology controllers 116. TSPP scheduling list numbers are routed directly to the appropriate TSPP port. Reverse broadcast channel numbers are translated to list numbers by appropriate multipoint table controllers 116 and passed to the TSPPs 90.

Figure 8:
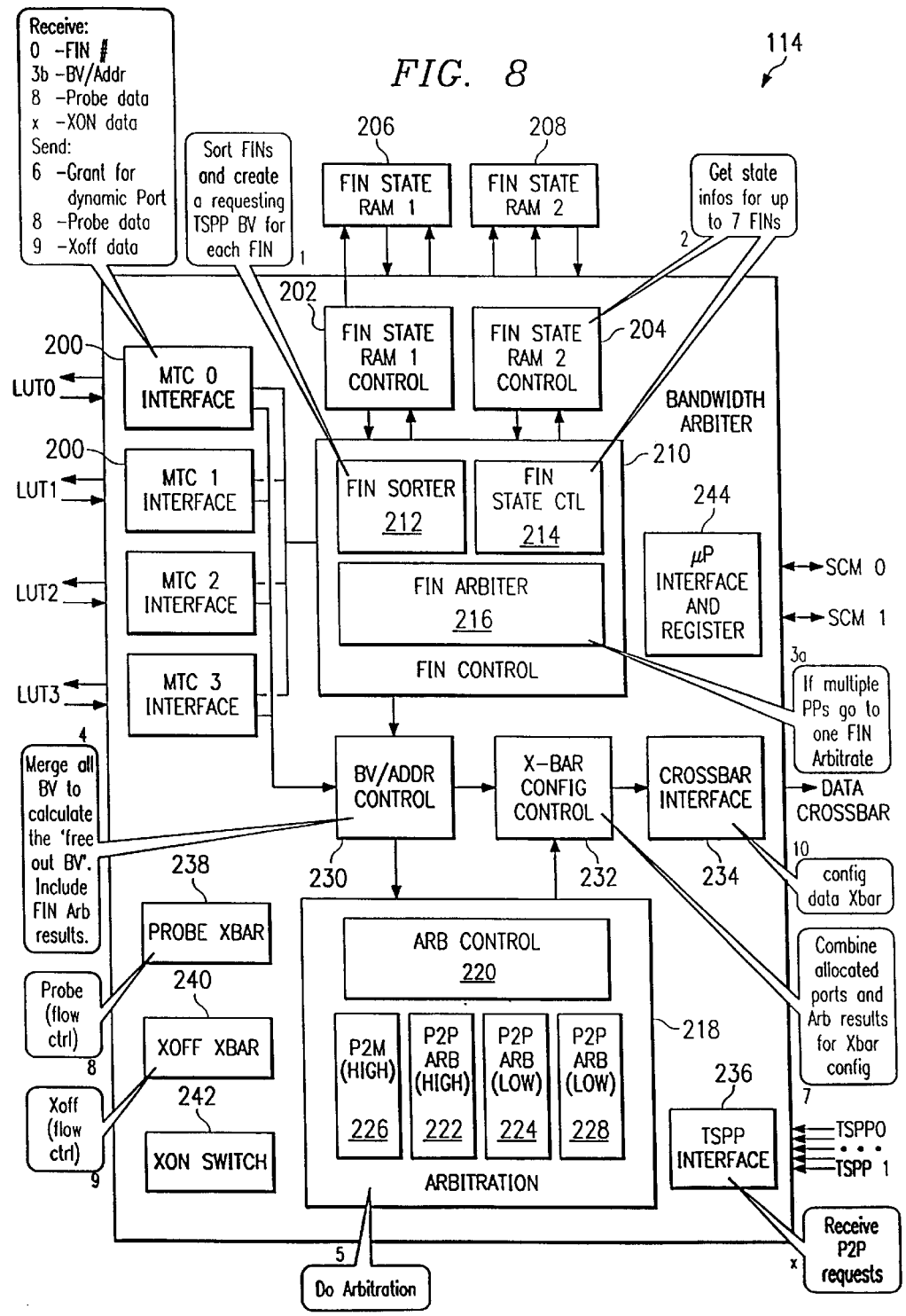
FIG. 8 illustrates a block diagram of a bandwidth arbiter in the switching fabric.

FIG. 8 is a block diagram of bandwidth arbiter 114. Bandwidth arbiter 114 includes a plurality of MTC interfaces 200 that handle communications from one or more multipoint topology controllers 116. Each MTC interface 200 has two buffers, one for receiving and one for holding. A FIN state RAM1 controller 202 and a FIN state RAM2 controller 204 perform the interface and access to FIN state RAM1 memory 206 and FIN state RAM2 memory 208, respectively. A FIN control unit 210 within bandwidth arbiter 114 includes a FIN sorter 212, a FIN state controller 214, and a FIN arbiter 216. FIN sorter 212 sorts all requested FINs. More than one TSPP 90 may have been allocated to the same FIN. FIN sorter 212 figures out which FINs to get scheduling information for and groups all TSPP numbers going to each FIN. This group of TSPP numbers is then forwarded to the M2P arbiter. FIN state controller 214 calculates new state information for each FIN. FIN arbiter 216 performs the arbitration in the event multiple TSPPs 90 are associated with one FIN.

Bandwidth arbiter 114 includes an arbitration unit 218 that has an arbitration controller 220, low and high point-to-point arbiters 222 and 224, and low and high point to multipoint arbiters 226 and 228. Bandwidth arbiter 114 receives and stores requested ports from switch manager 118 in switch control module 32. Based on the unallocated ports, bandwidth arbiter 114 tries to find matches for each port participating in the arbitration. Point-to-point requests are stored in one bit vectors, one for each TSPP 90. Each bit in that vector indicates which output ports are needed and which aren't. Each TSPP 90 can set or delete bits in its request vector. A request bit remains set unless it is explicitly deleted by the TSPP. In case a request was matched, a grant in the form of a port number is sent back. For each TSPP 90, a maximum of four point-to-multipoint requests are stored in bandwidth arbiter 114. A point-to-multipoint request is removed after it was matched in arbitration. In case a request was matched, the ID number of the request is sent back.

Output port vectors having allocated flows are transmitted from multipoint topology controller 116 to bandwidth arbiter 114. A bit vector/address control unit 230 generates a free output port vector in response to the allocated slots. The free output port vector is forwarded to arbitration unit 218 in order to match dynamic request vectors to unallocated ports. A crossbar configuration controller 232 generates actual crossbar configuration data from the allocated port vectors determined in bit vector/address controller 230 and the results from the dynamic arbitration within arbitration unit 218. A crossbar interface 234 transmits the actual crossbar configuration data to switch fabric 30. A TSPP interface 236 terminates serial communication lines from each TSPP 90 for the direct handling of dynamic point-to-point requests from each TSPP 90.

Bandwidth arbiter 114 includes a probe crossbar 238 that allows for originating TSPP 90 to check for available queue space within a destination FSPP 92 before sending a cell. This probing is done by having the originating TSPP 90 send via multipoint topology controllers 116. MCC's multiqueue numbers to all destination FSPP 92 through probe crossbar 238. Based on the probe information, a destination FSPP 92 may issue an XOFF signal. XOFF signals get transmitted back to the originating TSPP 90 that sent the probe information through an XOFF crossbar 240. Once an XOFF condition gets resolved, the destination FSPP 92 sends information back to the originating TSPP 90 through an XON switch 242 to XON the appropriate queues.

A microprocessor interface and register unit 244 communicates to the primary and redundant switch control module 32 bandwidth arbiters 114 and multipoint topology controllers 116. Only one switch control module is enabled at a given time to access registers in bandwidth arbiter 114.

Operation of bandwidth arbiter 114 for an allocated flow begins by the receipt of the FIN and subFIN from an originating multipoint table controller 116. For point-to-point and point-to-multipoint, the FIN and subFIN values are set at an invalid state. For multipoint-to-point and multipoint-to-multipoint connections, bandwidth arbiter 114 receives FIN and subFIN numbers from each multipoint topology controller 116 from a corresponding originating TSPP 90. If there are three originating TSPPs 90, three FIN and subFIN numbers will be sent. All three FIN and subFIN numbers are of the same value, which indicates that those three allocations are part of the same connection. The FIN subFIN numbers are stored in a table together with the bit vector. Each originating TSPPs position is marked in that vector by FIN sorter 212. State information for that FIN is read out of FIN state RAM1 206 and FIN state RAM2 208. FIN arbiter 216 performs a round robin contention resolution to select one TSPP 90 vying for that FIN state information. The state information is used to remember the last TSPP served.

Bandwidth arbiter 114 next receives a bit vector from multipoint topology controller 116 which represents the allocated output ports. For point-to-point connections, only one bit is set in the bit vector. For point-to-multipoint connections, several bits are set in the bit vector. For multipoint-to-point connections, each multipoint topology controller 116 sends bit vectors for the originating TSPPs 90 associated therewith with the same bit being set in all bit vectors received at bandwidth arbiter 114. For multipoint-to-multipoint connections, each multipoint topology controller 116 sends bit vectors for originating TSPPs 90 associated therewith with the same bits being set in all bit vectors received at bandwidth arbiter 114. The bit vector specifying the allocated output ports is combined with other connection vectors at bit vector/address controller 230 to generate a vector of all unallocated output ports. For multipoint-to-point and multipoint-to-multipoint connections, the bit vector of the selected TSPP 90 determined by FIN arbiter 216 is combined with other connection vectors to generate a vector of all unassigned output ports. The bit vectors of nonselected TSPPs 90 of that connection are discarded and those TSPPs are enabled for dynamic arbitration. TSPPs 90 which lost during arbitration within FIN arbiter 216 vie for dynamic bandwidth for another connection that occurs in a dynamic flow process to be discussed below.

Crossbar configuration controller 232 combines the bit vector specifying the allocated output ports in point-to-point and point-to-multipoint connections with other connection vectors to generate the crossbar configuration data. For a multipoint-to-point and multipoint-to-multipoint connections, the bit vector of the selected TSPP 90 is combined with other connection vectors to generate the crossbar configuration data.

Bandwidth arbiter 114 receives the probe FSPP queue number from the multipoint topology controller 116 coupled to the originating TSPP 90 in point-to-point and multipoint-to-point connections. For point-to-multipoint and multipoint-to-multipoint connections, bandwidth arbiter 114 receives the probe forward broadcast channel number from the multipoint topology controller 116 coupled to the originating TSPP 90. Probe crossbar 238 is configured using the crossbar configuration data. The probe data is sent through the probe crossbar 238 to multipoint topology controllers 116 coupled to terminating FSPPs 90. At the XOFF crossbar 240, bandwidth arbiter 114 receives an XOFF flag from the multipoint topology controllers 116 coupled to terminating FSPPs 90. The XOFF crossbar 240 is configured and the XOFF flag is switched through and sent to multipoint topology controller 116 coupled to the originating TSPP 90. Crossbar interface 234 then configures the data crossbar using the crossbar configuration data.

In dynamic flow operation, bandwidth arbiter 114 receives a point-to-multipoint connection request directly from a TSPP 90 at TSPP interface 236. Bandwidth arbiter 114 stores the request until the TSPP 90 deletes it. Multipoint-to-point connections operate in a similar manner as point-to-point connections in the dynamic flow process, except that originating TSPPs 90 vie individually during dynamic arbitration. For point-to-multipoint and multipoint-to-multipoint connections, bandwidth arbiter 114 receives a bit vector from the multipoint topology controller 116 coupled to the originating TSPP 90. For all connections, bandwidth arbiter 114 receives a zero or invalid FIN and subFIN numbers from appropriate multipoint topology controllers 116. Since the FIN is invalid, no processing is performed by FIN control unit 210.

Dynamic arbitration is performed in arbitration unit 218. High and low requests for each type of connection compete with each other for the unallocated output ports. Bandwidth grants are forwarded to be added to the crossbar configuration data. A granted port is transmitted back to the multipoint topology controller 116 coupled to the winning originating TSPP 90. TSPP 90 will determine a queue number to send based on the granted port number. For point-to-point connections, this queue number is sent back to bandwidth arbiter 114 through the associated multipoint topology controller 116 in time to be used in the probe process. For multipoint-to-multipoint connections, a request 1D is transmitted back to the multipoint topology controller 116 coupled to the originating TSPP 90. TSPP 90 will use that request 1D pointer to take that request from the head of the multipoint dynamic list. TSPP 90 will send the queue number of that request to bandwidth arbiter 114 through multipoint topology controller 116 for probing.

At crossbar configuration controller 232, the output port in point-to-multipoint connections and the output port vector in point-to-multipoint connections granted during dynamic arbitration is combined with other connection vectors to generate the crossbar configuration data. At probe crossbar 238, the FSPP multiqueue number (for point-to-point connections) or the FBCN number (for point-to-multipoint connections) is received from the multipoint topology controller 116 coupled to the originating TSPP 90. Probe crossbar 238 is configured using the crossbar configuration data and the probe data is switched through probe crossbar 238 for transfer to multipoint topology controllers 116 coupled to the appropriate terminating FSPP 92. At XOFF crossbar 240, an XOFF flag from the multipoint topology controller 116 coupled to the terminating FSPP 92 is received and XOFF crossbar 240 is configured to switch the XOFF flag through to the multipoint topology controller 116 coupled to the originating TSPP.

The goal of the Bandwidth Arbiter (BA) is to make the switch more efficient by giving unused switch bandwidth to requesting TSPPs. Unused bandwidth is either unallocated bandwidth (no entry in the Switch Allocation Table) or allocated bandwidth which is not used by a TSPP. The 'extra' bandwidth is used by the TSPPs for the dynamic traffic classes.

To optimize the arbitration, the BA is devided into two main arbitration engines: a Point-to-Point and Point-to-Multipoint Arbiter. To provide different classes of services within the dynamic traffic, a two-level priority scheme is implemented.

Each TSPP sends the following information to the BA:

The allocated output ports. The SAT table in each TSPP allocates a set of output ports in a cell time. The unused output ports can be calculated from the allocated output port information. Those outputs are either scheduled, but not used or haven't been allocated at all. By definition, all outputs which aren't allocated are free to be used in arbitration. A TSPP which has an allocated slot, does not participate in arbitration.

Requested output ports. A TSPP requests certain output ports which the BA tries to map with the available ports. The successfully matched requests are granted back to the TSPP. The requests are devided into P2P request which specify one particular FSPP and into P2M requests which specify several FSPPs.

The Bandwidth Arbiter stores the following information:

Requests. The BA stores the requests sent from the TSPPs. P2P requests are stored in one bitvector, one for each TSPP. Each of the P2M requests are stored in its own bitvector. Every TSPP may have up to 4 outstanding P2M stored. A priority level is stored along with each P2P and P2M request. P2P requests are set and deleted by the TSPP where as P2M requests are deleted by the BA upon granting.

State information. To implement a Round Robin scheme, state information is stored to determine the last TSPP served.

The Bandwidth Arbiter executes the following operations:

The available output ports are compared with the request of those inputs which does not have an allocated slot. Based on the priority, matched requests are granted.

The primary configuration described in this document is a 16×16 arbiter.

The basic concept of arbitration is to find a match between the vector of unallocated output ports and the requested vector. In order to grant a request, all requested output ports must be available at a time, partial mapping is currently not done. As a first step, the BA calculates the unallocated output port vector by means of or'ing all allocated vectors together.

The unallocated output port vector is then applied to all the requests made by each TSPP. If all requested bit are present in the unallocated vector, a match is granted. The request is subtracted from the unallocated vector, which then serves as the input to the next request. Eventually, the unallocated vector will be almost all zeros and no match can be found anymore. The TSPPs at the beginning of this cycle have a better chance to match their requests, since the unallocated vector still has set most of its bits. Therefor the start position of this chain should round robin among the TSPPs.

If a request has a lot of bits set, the chances are less to get match, since all positions of the request need to line up with a position in the unallocated vector. The efficiency (chances of a match) can be increased by having more than one outstanding request. The best case for finding a match is, if only one bit is set in a request. Since it is expected, that a lot of connections are only P2P (which means only one output is requested), it is worth while to do some optimizations for those type of connections. A point-to-point request can be represented by only one bit rather than a 16bit wide vector. Those one bit requests can be grouped into a request vector. Each bit in this vector represents one request, where as a P2M request vector represents only one request. This P2P request vector is then matched up with the unallocated output vector. Most likely the results are several possible 'winners', from which one needs to be selected. This bit position is removed from the unallocated vector and then passed on to the next P2P request vector.

P2M and P2P arbitration elements are combined to form a complete arbiter. Each TSPP can have P2M and P2P requests stored in the BA. The unallocated output port vector is first passed into the P2M arbitration elements. The 'left-over' vector is then forwarded to the P2P arbitration unit. The P2P requests 'fill in' what ever P2M requests couldn't. P2M is done first, because those requests are harder to match. Each TSPP can have four outstanding P2M requests and 16 P2P requests (each output port). For a given cell time, one TSPP can only get granted for one request, P2M or P2P.

In order to support traffic with different priority levels through the switch, the Bandwidth Arbiter has two arbitration stages or two priorities. The TSPP defines the priority level for each of its requests. High priority requests are tried to match first, followed by the low priority requests. Because the high priority request will get the new unallocated output port vector, the chances for a match are higher than those for the low priority requests. The higher chance for a match translates into a quicker response and more bandwidth (=higher priority).

No 'fairness mechanism' is implemented. Arbitration relies on a Round Robin mechanism.

The BA distributes the available bandwidth amongst the vying TSPP on a round robin basis. The 'Start Arb High' pointer selects at which TSPP the arbitration starts. The TSPP which has the 'first shot' at the Free Output Port Vector has the greater chance to match his requests. The start point for the Free Output Port Vector is therefor rotated among the enabled TSPPs. The start point is only given to those TSPPs which are enabled and have requests set. So, if only TSPP2 and 3 have requests, it is arbitrated among those. The High and Low Priority have their own starting point.

The P2M Arbitration selects the winning request from the oldest to newest request. There are four request per TSPP, the oldest one is granted first.

The P2P Arbitration selects the winning request in a Round Robin fashion.

Each TSPP can have up to 4 outstanding P2M requests. A request consists of a 16 bit wide vector, request ID and a priority indication. The bit vector specifies the requested output ports (FSPPs). The request ID gives a unique identification to each request. The ID will eventually be send back to the requesting FSPP. The priority bit specifies whether the request is high or low priority. The flow through a P2M arbitration this cell is:

Select the input to the High Priority Arbitration portion. Having the 'first shot' at the Free Output Port vector increases the chance to find a match. Therefore, a round robin scheme selects a TSPP at which arbitration is started. This Arbitration is done in the Arbiter Control Module which is discussed later. If this particular P2M Arb Cell does not has the 'first short', the 'left overs' from the previous arbitration are used.

If the TSPP had an allocated slot or is disabled, no arbitration is done for this TSPP. The information 'do_arb' is coming from the Bit Vectro Control Module.

The selected Free Output Ports are now processed to find a match with the P2M requests. Those requests were send in previous cell cycles by the TSPPs.

In case of a successful match, the requested output ports are subtracted from the Free Output Port Vector. The 'left-overs' are forwarded to the next arbitration cell. If there was no match, the original free vector is forwarded.

If a request was successfully matched, this TSPP does not continue to arbitrate in the P2P High, P2M Low and P2P Low arbitration (since it is all ready served).

The grant, which consists of the request ID and the bit vector, is buffered to be forwarded to the P2M Low arbitration.

If there was no match in the P2M or P2P High arbitration for that port, the TSPP continues with P2M Low arbitration. Just like in the High priority arbitration, the Free Output Port Vector is selected based on the start point. If arbitration started at this TSPP, the vector is selected from the P2P Low arbitration cell, otherwise from the upstream P2M Low Cell.

P2M Low Arbitration is performed. In case of a match, the requested output ports are substracted from the Free Output Port Vector. The winning request is buffered to be forwarded to the Bit Vector Control Module. If there was already a match in the High Priority Block, no arbitration is done and the high priority grant will be forwarded.

The Bit Vector Control Module will process the grant and forward it to the MTC.

The selected Free Output Port Bit Vector is applied in parallel to all four requests. Each request checks for a match, which means that at all requested ports must be included in the free port vector. If there was one or more matches, one winning request is selected. The requested ports are subtracted from the free port vector and the 'left over' vector is buffered to be passed on to the downstream arbitration element. The selected winner is buffered and will eventually be sent back to the MTC/TSPP. If there was no match at all, the original free port vector is forwarded and no grant stored. The winning request is removed and the remaining requests are shifted right (the most right request is therefor the oldest one). The selection process of the 'winner' is done from the right to the left, starting therefore with the 'oldest' request.

To guarantee that hard to match requests are getting served in a predictable time, slots in all SAT tables will be left open for dynamic arbitration. The arbiter will enforce that the TSPPs will receive those free SAT slots in a round robin fashion.

The four P2M requests are stored in register banks. RAM would require to many clock cycles to allow arbitration among all TSPPs and all requests. The requests remain in the Arbiter until they get matched. A matched request will be deleted in the BA by invalidating it.

If a new request is received without having a free spot (=fifth request), the request is dropped and an error message will be generated (interrupt). A future release may support a Set and Delete command for P2M connections, similar to the P2P scheme.

The connection topology and therefore the output port vector of a connection can change while a request for that connection is stored in the BA. However, the Arbiter should not arbitrate with outdated data. To guarantee concurrence, the requests of a TSPP in the BA are 'flushed', each time a bit vector update occurs in the MTC for that TSPP. The MTC is responsible for issuing a flush command to the BA and to the TSPP (the TSPP has to retransmit its requests). As bit vector updates are not very frequent, a flush per BV update hardly effects arbitration performance. The scheme could be optimized, such that it searches through the stored requests, to figure out whether the bit vector of a current request was changed. This would reduce the amount of flush command issued.

The Request ID is a 4 bit number (only 2 bit are currently implemented) which uniquely identifies P2M requests. The TSPP sends a ID along with each P2M request. The BA holds on to that ID along with the request. A matched P2M request then granted by sending that Request ID back to the TSPP. The BA and TSPP are therefore independent in terms of how to store the P2M requests (unlike when an 'offset' pointer is passed back). The TSPP is free in assigning IDs.

As an example, this could be done by incrementing the IDs or to have different lists for each of the 4 outstanding requests.

The priority of a request is indicated by the two MSB of the Request ID. The BA only supports two level of priority and therefor looks only at the most MSB.

It is important that no request gets lost. The TSPP would assume that it has a request waiting in the BA, which is in fact not the case. As a result, one TSPP List would not get dynamic bandwidth. An output port vector update in the MTC triggers a 'flush' which causes the TSPP and the BA to reset their P2M requests. If for some reason TSPP and BA had gone out of sync, a 'flush' will re-sync them. However, the 'flush' itself needs to be carefully designed. The case that a P2M Request is 'on the fly' from TSPP to MTC to BA while a 'flush' occurrence must be taken care of.

The TSPPs send Point-to-Point Requests directly to the Bandwidth Arbiter. Requests are sent by using 'set' and 'delete' requests. A request points to a particular FSPP. The BA keeps a record of which request is set and which are not. This information is stored in a register bank. A request remains set until the TSPP removes it—unlike in the P2M Arbitration were requests are deleted upon request. (In P2M Arbitration, each request is associated to a particular connection, whereas in P2P multiple connections are going to one output port and are cause a port to be 'set'). Two levels of priority are supported. A request for a FSPP can be either high or low priority. The P2P_CELL Module handles the requests, whereas is the P2P BLOCK Module handles all arbitration. The flow through the P2P Cell is:

The TSPPs send P2P Requests in form of a 'set' and 'delete' command to the BA. The BA shifts in the commands and buffers them to allow for command execution. The BA interprets the commands and maintains a register bank which holds the requests. There are two levels of priority (High and Low). Each of them is represented by a separate bank of registers.

Maintain the state information of the Round Robin scheme. These pointers, one for each priority level, points to the last request served. This will be the starting pointer for the next arbitration to select a winning request.

The flow through the High P2P Block is:

At the start of P2P High Arbitration, the remaining 'Free Output Port Vector' from the P2M High Arbitration is selected. At the same time the request vector, stored in the P2P Cell, is muxed into the Arbitration Block. The vectors are matched ('and'ed) to determine possible winners.

Based on the state information, which is also muxed in from the P2P Cell, one winner is selected based on a round robin scheme. The state information points to the 'last port served'.

The winning port is subtracted from the 'Free Output Port Vector'. The left overs are buffered to be used for the next TSPP P2P arbitration.

The grant is buffered on a per TSPP basis to be forwarded to the low priority Arbitration Block. After all TSPPs have arbitrated the left over 'Free Output Port Vector is used by the Low Priority P2M Arbitration.

In parallel to the arbitration in the high block, the low priority arbitration is performed (pipelined delayed).

The P2P requests are stored in registers inside the BA. For each TSPP there is a 16 bit wide vector. Each bit out of this vector represents an output port. A bit set means this output port is requested. Each priority, two in the current implementation, is represented by its own bit vector.

The TSPP sends 'set' and 'delete' commands to the BA. In a giver cell time three of those commands can be received. The BA processes them in order (say—the first command deletes a request but the second command sets it—the request will end up being set). A set command will set a bit in either of the two (high or low) vectors independent of the current setting. If it is already set, nothing changes. If the bit in the other priority vector was set, it will be set to the specified priority (this is essentially a 'change priority' command). If it was not set at all, it will be set. A delete command removes the request no matter what priority.

The request priority is stored by means of two vectors —one for high, one for low. The priority is communicated by the TSPP along with the set and delete commands.

A "Winner Look-Ahead" scheme shortens the propagation delay through the element by a large amount.

The TSPP at which the arbitration starts is chosen in a round robin way. The ARB_CNTRL module generates the start point for the high and the low priority.

Since some TSPPs may have only high or low requests, there is a different start vector for each of the two priorities. Every cell time, pending requests for each enabled port are reported to the ARB_CNTRL module. The start pointer is moved to the next port which has a request pending.

To avoid dead-lock situations for P2M requests, there are reserved slots in the SAT table where no port is allocated. The 'free output port' vector includes all ports, hence guarantees a match of a multicast request. Beside the standard arbitration for the high and low priority start-pointer, a third round robin scheme is used during those 'all free' SAT slots.

Partial Mapping is not done in the Bandwidth Arbiter. Partial Mapping means, that—for a P2M request—a subset of the requested ports are granted. The request remains in arbitration until all ports are matched.

The FIN:SubFIN mechanism is the FIN Logic in the BA that receives the FIN:SubFIN from each TSPP, correlates these, and does the bandwidth processing and TSPP arbitration. The FIN Logic is partitioned into the following elements:
FIN Sorter.
FIN Processor.
FIN State RAM 1 and FIN State RAM2.

Each cell cycle FIN information is received by the FIN Sorter via the MTC to BA serial line interfaces. This information consists of:
FIN Valid—This bit indicates valid/invalid FIN information.
The FIN (Fan In Number)—This is a 16-bit quantity
The SubFIN—This is a 3-bit quantity
Xoffed Information—This information consists of two bits:
Currently Xoffed and Was Xoffed.
This information is correlated by the FIN Sorter and the results passed to the FIN Processor.

For each valid FIN this correlated information (called a FIN Entry) consists of:
The valid FIN:SubFIN.
The associated Xoffed Information.
A 16-bit vector indicating which TSPPs sent the FIN (called a Port Map).
In addition a 7-bit vector indicating which FIN entries are valid, and a 16-bit vector indicating which TSPPs are not part of an M2P/M2M connection are sent to the FIN Processor.

The FIN Processor processes the information received from the FIN Sorter and generates a FIN Result vector. This 16-bit vector indicates which TSPPs have won FIN arbitration. The sorting/processing of the FINs is pipelined so that a result can be generated each cell cycle. Because of FIN state RAM bandwidth only seven discrete FINs can be handled by the FIN Logic each cell cycle.

The FIN Sorter receives FIN information each cell cycle via the MTC to BA serial line interfaces. An invalid FIN may be indicated in two ways.

Deasserted FIN Valid.

FIN ==16'h0.

An all zero FIN is detected by the serial line interface, which then deasserts the FIN Valid bit (if it was asserted) that is sent to the FIN Sorter. An invalid FIN from a TSPP indicates that it is not participating in an M2P/M2M connection. Those TSPPs that are not participating in such a connection must be marked as granted in the FIN Result vector. For this reason the FIN Sorter needs to keep track of these non-participating TSPPs.

The FIN Sorter keeps track of the FIN information to be handled in each cell cycle via a FIN Entry for each discrete FIN encountered in that cycle. Since no more than seven such FINs are allowed per cell cycle, seven FIN entries are accommodated. The FIN Sorter looks at the FIN information from each TSPP in sequence, starting with TSPP 0 and ending with TSPP 15. For each valid FIN a search of the FIN entries is made. If this FIN has been sent from a previously looked at TSPP in this cell cycle, a valid entry already exists for this FIN, but this entry's Port Map needs to be updated. If no entry for the FIN exists, an empty entry is found, marked as valid, the FIN information written into it, and its Port Map updated.

If an empty entry cannot be found, more than seven FINs have been scheduled and an error is detected. Each FIN Entry consists of a valid bit, the FIN information (FIN, SubFIN, Xoffed bits), and a Port Map. The Port Map is a 16-bit vector, where each bit represents a TSPP whose FIN matches the entry's FIN.

The FIN Processor receives up to seven valid FIN entries from the FIN Sorter each cell cycle. Each of the valid entries is processed as follows:

Read the stored FIN state from the FIN State RAMs.
Process the FIN Entry information along with the stored state to determine if the TSPPs within the requesting SubFIN are eligible to compete for a grant.
If they are eligible, arbitrate among them to pick the winner.
Write the updated FIN state back to the FIN State RAMs.

M2P/M2M connections are allocated too much bandwidth at the TSPPs so that a bandwidth limiting mechanism is required. This bandwidth limiting mechanism is performed at the BA by counting SAT slots granted per time period on a per FIN basis. Two modes of bandwidth limiting are implemented:

Burst Mode—The number of cells allowed to be sent per FIN (each of which is associated with a M2P connection) per Super Frame is limited to a fixed value. The Bandwidth Limit Mode bit in FIN State RAM 1 is asserted, and Burst Limit and Burst Count are defined as follows:

Burst Limit—The number of cells associated with a particular FIN that may be sent in a Super Frame interval. This value is stored in FIN State RAM 1 on a FIN basis. It is stored by the microprocessor prior to the FIN being used.

Burst Count—The number of cells associated with a particular FIN that have been sent so far in the current Super Frame. This value is stored in FIN State RAM 1 on a FIN basis. It is updated each time a request to send a cell is granted.

A request to send a cell is granted if bandwidth limiting is not in effect and the SubFIN associated with the cell is not being suppressed because other SubFINs are pending. When the Burst Count exceeds the Burst Limit bandwidth limiting is in effect, and the request to send a cell is denied.

When a new Super Frame is entered, the Burst Count is effectively initialized to zero. This is done as follows. Each time a request to send a cell is granted, the Super Frame count is written as a "timestamp" into the FIN State RAM 1 TS entry for the FIN. Each time a request to send a cell is processed this timestamp is compared to the current value of the Super Frame count. If the two miscompare, a new Super Frame has been entered. In this case, if the SubFIN is not being suppressed by other pending SubFINs, the request is granted and the Burst Count updated to a count of one.

Pacing Mode—For each FIN a fixed interval (number of SAT slots) is enforced between allowing cells to be sent. The Bandwidth Limit Mode bit in FIN State RAM 1 is deasserted, and Pacing Interval and Last SAT Slot are defined as follows:

Pacing Interval—The Interval between which cells associated with a particular FIN may be sent. This value is stored in FIN State RAM1 on a FIN basis. It is stored by the microprocessor prior to the FIN being used.

Last SAT Slot—The SAT slot number at which the last cell was sent. It is updated each time a request to send a cell is granted.

A request to send a cell is granted if bandwidth limiting is not in effect and the SubFIN associated with the cell is not being suppressed because other SubFINs are pending. When the Last SAT Slot plus the Pacing Interval is greater than the current SAT slot number bandwidth limiting is in effect, and the request to send a cell is denied.

Each time a new Super Frame is entered, the pacing interval is satisfied for the first request in the new Super Frame for each requesting FIN. Entering a new Super Frame is detected as follows. Each time a request to send a cell is granted, the Super Frame count is written as a "timestamp" into the FIN State RAM 1 TS entry for the FIN. Each time a request to send a cell is processed this timestamp is compared to the current value of the Super Frame count. If the two miscompare, a new Super Frame has been entered.

To insure the fair allocation of bandwidth in M2P/M2M connections arbitration occurs on two levels.

SubFINs within a FIN.

TSPPs within a SubFIN.

The interaction of SubFINs and bandwidth limiting could result in cases of certain SubFINs getting starved. However an arbitration mechanism is incorporated which prevents this. When bandwidth is limited it is possible that only a portion of the SubFINs within a FIN will get served in a Super Frame. If when the next Super Frame is entered no preference is given to those SubFINs that were passed up in the previous Super Frame due to bandwidth limiting, these SubFINs will again be denied service and will starve.

A 2-bit vector (SubFIN Arbitration State Vector) is used to maintain kind of a request/grant record for each of the eight SubFINs within a FIN. This record is stored in FIN State RAM 2. The four SubFIN Arbitration State Vector states are:

Default State (00)—As long as bandwidth limiting is not in effect, the vector remains in this state. When there is no bandwidth limiting there is no danger of starvation and prioritization is not required.

Served State (11)—Once bandwidth limiting comes into effect, and until all of the SubFINs of a FIN have been served, this state keeps track of those SubFINs that have been served.

Pending State (10)—This state keeps track of those SubFINs that have been denied due to bandwidth limiting. Once bandwidth limiting is no longer in effect, these SubFINs take precedence over those in the Default, Served or Declined state. When the last "pending" SubFIN has been serviced all of the SubFINs of the FIN are set to the Default State so that they once again have even priority.

Declined State (01)—This state provides a mechanism for detecting "dead" requesters. It is possible that a SubFIN requests previously marked as pending will not be made again. This state is entered for SubFINs that are denied because other SubFINs are in the Pending State. Each time a pending request is serviced, the SubFINs in this state are "reset" back to the Served State. As long as pending requests are serviced, previously serviced SubFINs ping-pong between the Declined State and the Serviced State. If pending requesters are dead, eventually a requester that is in the Declined State will be serviced, and while other SubFINs are still in the Pending State. These still pending requesters are dead. In order to remove such "dead" requesters all of the SubFINs in the affected FIN are reset to the Default State.

As long as the bandwidth limit is not in effect, subFIN requests are granted without marking the State Vector. After the bandwidth limit kicked in, requesting SubFINs are declined and the subFIN state is set to '10' to remember the request. The subFIN which causes the BW limit to become active is marked as requested and serviced by setting both bits. This avoids the effect, that this subFIN is favored.

When the BW limit is off, the SubFINs which are marked as requesting are serviced first before any other subFIN is granted. A requested and serviced subFIN is marked by setting both bits to '1'. A subFIN which is marked as requested and serviced is not granted again if other requests are still pending. The State Vector is cleared as soon as all requests have been serviced.

If a subFIN is declined because other requests are pending, it is marked with a '01' encoding (line 4, Table 7-5). A subFIN marked in this way will not be declined a second time because of pending requests. Such an event would indicate, that a subFIN request was marked once, but is not requested again. Those 'dead' requests must be removed by clearing the subFIN state vector, since they would block other SubFINs from being serviced.

However, if a pending request is not 'dead', which means it is requested again, all SubFINs which are marked as 'declined once' are set back to 'requested and serviced'. Since the 'declined once' marker is a mechanism to detect 'dead' requests, 'alive' requests should reset that mechanism.

The FIN:SubFIN mechanisms may interact with other mechanism like XOFF/XON scheme and the SubQueues. Those interactions are described in this paragraph.

For a M2P or M2M connection the BA performs arbitration among the contending TSPPs. The state information of that arbitration process is stored in external RAM and updated after each arbitration. Stored information is the winning TSPP and a bandwidth count. The selected TSPP will go through the Probe and XOFF procedure to check for buffer space in the FSPP. If a XOFF was asserted the TSPP will not send a cell. However, the FIN state data (like bandwidth limit) had been already updated in RAM assuming the TSPP would send a cell. Even with Offs, fairness (equal opportunity) for TSPPs to send cells must be guaranteed.

The following mechanisms will guarantee that fairness:
1) The TSPP sends it's allocated queue number to the MTC along with the current XOFF status. The current XOFF status is encoded with 2 bits. That means, the TSPP always sends it's allocated queue number, even though it may be Xoffed. Only if the queue is empty is no allocated queue number sent to the MTC.
2) P2M requests may be sent in the remaining, not allocated slots, or if an allocated queue is empty.
3) The TSPP stores in its queue descriptor the current state of XOFF. This could be either no XOFF, a XOFF for dynamic bandwidth or a XOFF for allocated bandwidth. With an additional bit, the TSPP keeps track of whether he had send a cell since the last XON.
4) The XOFF state information is, along with a FIN number, forwarded to the FIN arbitration unit.
5) The TSPP sends together with its (allocated) request a flag, saying whether the flow is Xoffed, or whether this TSPP was Xoffed. In the first case, the BA would grant none of the TSPPs, in the second case, the BA would grant those TSPPs first over TSPP which does not have their 'was Xoffed' flag set (their could be more than one TSPP Xoffed because of the pipeline).
6) If the TSPP which got Xoffed does not request and says 'I am Xoffed', each TSPP would get Xoffed individually. This would cause lost opportunities for other flows.
7) However: the TSPP does not know, that this flow is a M2P/M2M flow—he would need to learn that.
8) The XON shreshold is equal to the number of active SubFINs
9) The XON threshold can be lower, if a BW limit is 'faked' if an XOFF occurs at the BA The next time the TSPP is vying for a M2P grant on that Xoffed connection, the TSPP will communicate to the BA that he was Xoffed the last time. The BA will give priority to this TSPP and will not change the FIN state information, since this was already done before.

To avoid the possible case of starvation, the XON threshold in the FSPP is set to be at least the number of active SubFINs. Doing so, all SubFINs get a chance to send a cell after they have been Xoffed.

The M2P Arbiter selects for each of the up to seven FINs a TSPP which gets granted to send its cell. The M2P Arbitration and the bandwidth check for the FINs can be done in parallel.

A TSPP can be marked only in one of the bit vectors, since each TSPP can have only one allocation per cell time. This allows, if necessary, to perform arbitration for several FINs in parallel. However, only one instantiation of the M2P Arbiter is desired, if timing allows to do so.

Once the FINs are sorted the actual arbitration is reduced to a round robin scheme. The starting point is the position of the last TSPP to win arbitration. The bit vector is searched for the next set ('1') TSPP, which wins arbitration and gets granted.

Thus, it is apparent that there has been provided in accordance with the present invention, an asynchronous transfer mode based service consolidation switch that provides the advantages set forth above. Although the present invention has been described in detail, it should be understood that various changes, substitutions, and alternations readily ascertainable to one skilled in the art can be made herein without departing from the spirit and scope of the present invention as defined by the following claims.

What is claimed is:

1. A method for queuing data of plural virtual connections, each having a quality of service value associated therewith, in a communications device having a plurality of input ports, the method comprising the steps of:

receiving a plurality of input signals on said input ports of said communications device, at least one of said input signals comprising data associated with a first of said virtual connections;

associating an input queue with said first virtual connection for exclusive use by said first virtual connection;

associating an output queue with said first virtual connection for exclusive use by said first virtual connection;

controlling the flow of said first virtual connection from a respective input port of said communications device to a switching fabric associated with said communications device by utilizing said input queue associated with said first virtual connection and the quality of service associated with said first virtual connection; and controlling the flow of said first virtual connection from a switching fabric associated with said communications device to an output port of the communications device by utilizing said output queue associated with said first virtual connection and the quality of service value associated with said first virtual connection.

2. A communications device for receiving and enqueuing data associated with plural virtual connections, each virtual connection having a quality of service value associated therewith, comprising:

a plurality of input ports operable to receive a plurality of input signals, at least one input signal comprising data associated with at least one of said virtual connections;

a plurality of input queues, each of said input queues being exclusively associated with a respective one of said plural virtual connections and operable to schedule data associated with said respective virtual connection according to a quality of service value associated with said respective virtual connection;

a plurality of output queues, each of said output queues being exclusively associated with a respective one of said virtual connections and operable to queue data associated with said respective virtual connection; and a switching fabric coupled to said input queues and to said output queues, wherein said input queue associated with a respective virtual connection controls the flow of said respective virtual connection from an input port of the communications device to said switching fabric, and wherein said output queue associated with a respective virtual connection controls the flow of said respective virtual connection from said switching fabric to an output port of the communications device.

3. A method of processing data units at a network node, comprising:

receiving said data units at said network node, said data units being associated with a first virtual connection;

input enqueuing said received data units in a first input queue, said first input queue for enqueuing received data units of said first virtual connection only;

scheduling said data units enqueued in said first input queue according to a quality of service parameter associated with said first virtual connection;

forwarding said scheduled data units through a switch fabric in said network node; and output enqueuing said data units in a first output queue via said switching fabric, wherein said first output queue is for enqueuing forwarded data units of said first virtual connection only.

4. The method of claim 3, wherein said first virtual connection comprises one of a plurality of virtual connections, wherein said first input queue comprises one of a plurality of input queues, and wherein said step of scheduling further comprises associating said first input queue with a scheduling list affiliated with ones of said plurality of input queues dedicated to respective ones of said plurality of virtual connections having a first quality of service parameter associated therewith.

5. A communications device for processing data units, comprising:

an input port for receiving data units associated with a first virtual connection;

a first input queue for enqueuing said received data units, said first input queue being dedicated exclusively to said first virtual connection;

a scheduler operable to schedule said enqueue data units according to a quality of service parameter associated with said first virtual connection;

a switch fabric in selective communication with said first input queue; and a first output queue in selective communication with said switch fabric, said first output queue for enqueuing said scheduled data units of said first virtual connection only, wherein said switch fabric is for selectively interconnecting said first input queue to said first output queue.

* * * * *